US008532484B2

(12) United States Patent
Lee et al.

(10) Patent No.: US 8,532,484 B2
(45) Date of Patent: Sep. 10, 2013

(54) METHOD FOR ROUTING AND WAVELENGTH ASSIGNMENT INFORMATION ENCODING FOR WAVELENGTH SWITCHED OPTICAL NETWORKS

(75) Inventors: Young Lee, Plano, TX (US); Greg Bernstein, Fremont, CA (US)

(73) Assignee: Futurewei Technologies, Inc., Plano, TX (US)

( * ) Notice: Subject to any disclaimer, the term of this patent is extended or adjusted under 35 U.S.C. 154(b) by 291 days.

(21) Appl. No.: 12/965,217

(22) Filed: Dec. 10, 2010

(65) Prior Publication Data

US 2011/0081148 A1  Apr. 7, 2011

Related U.S. Application Data

(63) Continuation-in-part of application No. 12/898,778, filed on Oct. 6, 2010.

(60) Provisional application No. 61/303,380, filed on Feb. 11, 2010, provisional application No. 61/249,206, filed on Oct. 6, 2009, provisional application No. 61/252,982, filed on Oct. 19, 2009.

(51) Int. Cl.
*H04J 14/00* (2006.01)
*H04Q 11/00* (2006.01)

(52) U.S. Cl.
CPC ................ *H04Q 11/0005* (2013.01)
USPC .................. 398/49; 398/57; 398/58

(58) Field of Classification Search
USPC .......................... 398/48, 49, 57, 58
See application file for complete search history.

(56) References Cited

U.S. PATENT DOCUMENTS

| 7,761,092 | B2 | 7/2010 | Desch et al. |
|---|---|---|---|
| 8,208,405 | B2 | 6/2012 | Lee et al. |
| 8,208,808 | B2 | 6/2012 | Bernstein et al. |
| 8,249,451 | B2 | 8/2012 | Lee et al. |
| 8,290,366 | B2 | 10/2012 | Lee et al. |
| 2005/0080502 | A1 | 4/2005 | Chernyak et al. |
| 2008/0225723 | A1 | 9/2008 | Lee et al. |

(Continued)

FOREIGN PATENT DOCUMENTS

| CN | 101163090 A | 4/2008 |
|---|---|---|
| CN | 101621723 A | 1/2010 |

OTHER PUBLICATIONS

ITU-T Recommendation G.652, "Characteristics of a Single-Mode Optical Fibre and Cable," Jun. 2005, 20 pages.

(Continued)

*Primary Examiner* — Dalzid Singh
(74) *Attorney, Agent, or Firm* — Conley Rose, P.C.; Grant Rodolph; Brandt Howell

(57) ABSTRACT

An apparatus comprising a network element (NE) configured to communicate at least one of signal constraints and processing capabilities for a plurality of resource blocks (RBs) associated with a network node in a wavelength switched optical network (WSON) node Type-Length-Value (TLV) and signal constraints and processing capabilities associated with a link in a WSON link TLV, wherein the WSON node TLV comprises a node identifier (ID), one or more Generalized Multi-Protocol Label Switching (GMPLS) TLVs, a connectivity matrix TLV, and a resource pool TLV, and wherein the WSON link TLV comprises a link ID, one or more GMPLS TLVs, and a port wavelength restriction TLV.

19 Claims, 19 Drawing Sheets

(56) References Cited

U.S. PATENT DOCUMENTS

| | | | |
|---|---|---|---|
| 2008/0298805 A1 | 12/2008 | Lee et al. | |
| 2009/0110395 A1 | 4/2009 | Lee et al. | |
| 2009/0116836 A1 | 5/2009 | Bernstein et al. | |
| 2010/0100959 A1 | 4/2010 | Mahaffey | |
| 2010/0183308 A1 | 7/2010 | Gerstel et al. | |
| 2011/0022728 A1* | 1/2011 | Kern et al. | 709/242 |
| 2011/0081147 A1 | 4/2011 | Lee et al. | |
| 2011/0199938 A1* | 8/2011 | Kompella | 370/254 |
| 2012/0148234 A1* | 6/2012 | Bellagamba et al. | 398/28 |
| 2012/0148240 A1 | 6/2012 | Ceccarelli et al. | |

OTHER PUBLICATIONS

ITU-T Recommendation G.653, "Characteristics of a Dispersion-Shifted Single-Mode Optical Fibre and Cable," Dec. 2006, 20 pages.
ITU-T Recommendation G.654, "Characteristics of a Cut-Off Shifted Single-Mode Optical Fibre and Cable," Dec. 2006, 20 pages.
ITU-T Recommendation G.655, "Characteristics of a Non-Zero Dispersion-Shifted Single-Mode Optical Fibre and Cable," Mar. 2006, 23 pages.
ITU-T Recommendation G.656, "Characteristics of a Fibre and Cable With Non-Zero Dispersion for Wideband Optical Transport," Dec. 2006, 18 pages.
ITU-T Recommendation G.694.1, "Spectral Grids for WDM Applications: DWDM Frequency Grid," Jun. 2002, 11 pages.
ITU-T Recommendation G.694.2, "Spectral Grids for WDM Applications: CWDM Wavelength Grid," Dec. 2003, 10 pages.
ITU-T Recommendation G.698.1, "Multichannel DWDM Applications with Single-Channel Optical Interfaces," Nov. 2009, 34 pages.
ITU-T Recommendation G.698.2, "Amplified Multichannel Dense Wavelength Division Multiplexing Applications with Single Chanel Optical Interfaces," Nov. 2009, 38 pages.
ITU-T Recommendation G.709/Y.1331, "Interfaces for the Optical Transport Network (OTN)," Mar. 2003, 118 pages.
ITU-T Recommendation G.707/Y.1322, "Network Node Interface for the Synchronous Digital Hierarchy (SDH)," Jan. 2007, 196 pages.
ITU-T Recommendation G.872, "Architecture of Optical Transport Networks," Nov. 2001, 72 pages.
ITU-T Recommendation G.959.1, "Optical Transport Network Physical Layer Interfaces," Mar. 2006, 58 pages.
ITU-T Recommendation G.975.1, "Forward Error Correction for High Bit-Rate DWDM Submarine Systems," Feb. 2004, 58 pages.
Ash, J., et al., "Path Computation Element (PCE) Communication Protocol Generic Requirements," RFC 4657, Sep. 2006.
Berger, L., "Generalized Multi-Protocol Label Switching (GMPLS) Signaling Functional Description," RFC 3471, Jan. 2003.
Berger, L., "Generalized Multi-Protocol Label Switching (GMPLS) Signaling Resource Reservation Protocol-Traffic Engineering (RSVP-TE) Extensions," RFC 3473, Jan. 2003.
Bradner, S., "Key Words for Use in RFCs to Indicate Requirement Levels," RFC 2119, Mar. 1997.
Farrel, A., et al., "A Path Computation Element (PCE)-Based Architecture," RFC 4655, Aug. 2006.
Farrel, A., et al., "Encoding of Attributes for MPLS LSP Establishment Using Resource Reservation Protocol Traffic Engineering (RSVP-TE)," RFC 5420, Feb. 2009.
Kompella, K., et al., "OSPF Extensions in Support of Generalized Multi-Protocol Label Switching (GMPLS)," RFC 4203, Oct. 2005.
Kompella, K., et al., "Routing Extensions in Support of Generalized Multi-Protocol Label Switching (GMPLS)," RFC 4202, Oct. 2005.
Kompella, K., et al., "IS-IS Extensions in Support of Generalized Multi-Protocol Label Switching (GMPLS)," RFC 5307, Oct. 2008.
McCloghire, K., et al., "The Interfaces Group MIB," RFC 2863, Jun. 2000.
McCloghire, K., et al., "Structure of Management Information Version 2 (SMIv2)," RFC 2578, Apr. 1999.
Vasseur, J.P., et al., "Path Computation Element (PCE) Communication Protocol (PCEP)," RFC 5440, Mar. 2009.
Papadimitriou, D., "Generalized Multi-Protocol Label Switching (GMPLS) Signaling Extensions for G.709 Optical Transport Networks Control," RFC 4328, Jan. 2006.
Lee, Y., et al., "Framework for GMPLS and PCE Control of Wavelength Switched Optical Networks (WSON)," draft-ietf-ccamp-rwa-wson-framework-02.txt, Mar. 4, 2009.
Otani, Tomohiro, et al., "Generalized Labels for G.694 Lambda-Switching Capable Label Switching Routers," draft-ietf-ccamp-gmpls-g-694-lambda-labels-00.txt., May 27, 2008.
Otani, Tomohiro, et al., "Generalized Labels for G. 694 Lambda-Switching Capable Label Switching Routers," draft-ietf-ccamp-gmpls-g-694-lambda-labels-01.txt, May 27, 2008.
Otani, Tomohiro, et al., "Generalized Labels for G.694 Lambda-Switching Capable Label Switching Routers," draft-ietf-ccamp-gmpls-g-694-lambda-labels-02.txt., Jul. 14, 2008.
Otani, Tomohiro, et al., "Generalized Labels for G.694 Lambda-Switching Capable Label Switching Routers," draft-uieft-ccamp-gmpls-g-694-lambda-labels-03.txt., Jan. 13, 2009.
Otani, Tomohiro, et al., "Generalized Labels for G.694 Lambda-Switching Capable Label Switching Routers," draft-ietf-ccamp-gmpls-g-694-lambda-labels-04.txt., Mar. 23, 2009.
Otani, Tomohiro, et al., "Generalized Labels for G.694 Lambda-Switching Capable Label Switching Routers," draft-ietf-ccamp-gmpls-g-694-lambda-labels-05.txt., Dec. 7, 2009.
Otani, Tomohiro, et al., "Generalized Labels for G.694 Lambda-Switching Capable Label Switching Routers," draft-ietf-ccamp-gmpls-g-694-lambda-labels-06.txt., Mar. 19, 2010.
Otani, Tomohiro, et al., "Generalized Labels for G.694 Lambda-Switching Capable Label Switching Routers," draft-ietf-ccamp-gmpls-g-694-lambda-labels-07.txt., Apr. 8, 2010.
Bernstein, G., et al., "Framework for GMPLS and PCE Control of Wavelength Switched Optical Networks (WSON)," draft-ietf-ccamp-wavelength-switched-framework-00.txt, May 13, 2008.
Bernstein, G., et al., "Framework for GMPLS and PCE Control for Wavelength Switched Optical Networks (WSON)," draft-ietf-ccamp-wavelength-switched-framwork-01.txt, Oct. 31, 2008.
Lee, Y., et al., "Routing and Wavelength Assignment Information Model for Wavelength Switched Optical Networks," draft-ietf-ccamp-rwa-info-02.txt, Mar. 3, 2009.
Bernstein, G., et al., "General Network Element Constraint Encoding for GMPLS Controlled Networks," draft-ietf-ccamp-general-constraint-encode-00.txt, Feb. 18, 2010.
Bernstein, G., et al., "Modeling WDM Wavelength Systems for Use in GMPLS and Automated Path Computation," Journal of Optical Communications and Networking, vol. 1, Jun. 2009, pp. 187-195.
Lee, Y., et al., "OSPF Enhancement for Signal and Network Element Compatibility for Wavelength Switched Optical Networks," draft-lee-ccamp-wson-signal-compatibility-ospf-00.txt, Oct. 12, 2009.
Lee.Y., et al., "A Framework for the Control of Wavelength Switched Optical Networks (WSON) with Impairments," draft-ietf-ccamp-wson-impairments-00.txt, Jun. 29, 2009.
Lee, Y., et al., "A Framework for the Control of Wavelength Switched Optical Networks (WSON) with Impairments," draft-ietf-ccamp-wson-impairments-01.txt, Oct. 22, 2009.
Lee, Y., et al., "A Framework for the Control of Wavelength Switched Optical Networks (WSON) with Impairments," draft-ietf-ccamp-wson-impairments-02.txt, May 20, 2010.
Lee,Y., et al., "A Framework for the Control of Wavelength Switched Optical Networks (WSON) with Impairments," draft-ietf-ccamp-wson-impairments-03.txt, Jul. 9, 2010.
Lee, Y., et al., "Framework for GMPLS and PCE Control of Wavelength Switched Optical Networks (WSON)," draft-ietf-ccamp-rwa-wson-framework-00.txt, Dec. 5, 2008.
Lee, Y., et al., "Framework for GMPLS and PCE Control of Wavelength Switched Optical Networks (WSON)," draft-ietf-ccamp-rwa-wson-framework-01.txt, Feburary 9, 2009.
Lee, Y., et al., "Framework for GMPLS and PCE Control of Wavelength Switched Optical Networks (WSON)," draft-ietf-ccamp-rwa-wson-framework-03.txt, 03.txt, Sep. 8, 2009.
Lee, Y., et al., "Framework for GMPLS and PCE Control of Wavelength Switched Optical Networks (WSON)," Draft-ietf-ccamp-rwa-wson-framework-04.txt, Oct. 9, 2009.

Lee, Y., et al., "Routing and Wavelength Assignment Information Model for Wavelength Switched Optical Networks," draft-ietf-ccamp-rwa-info-06.txt, Feb. 8, 2010, 15 pages.

Martinelli, G., Ed., et al., "GMPLS Signaling Extensions for Optical Impairment Aware Lightpath Setup," draft-martinelli-ccamp-optical-imp-signaling-01.txt, Feb. 22, 2008, 19 pages.

Zhang, F., et al., "OSPF Extensions in Support of Routing and Wavelength Assignment (RWA) in Wavelength Switched Optical Networks (WSONs)," draft-zhang-ccamp-rwa-wson-routing-ospf-02.txt, Oct. 22, 2009, 13 pages.

Foreign Communication From a Related Counterpart Application, European Application No. 11741912.7, Extended European Search Report dated Nov. 2, 2012, 10 pages.

Foreign Communication from a Related Counterpart Application—International Search Report, PCT/CN2011/070927, May 19, 2011, 7 pages.

Foreign Communication from a Related Counterpart Application—Written Opinion PCT/CN2011/070927, May 19, 2011, 6 pages.

Lee, Y., et al., "Framework for GMPLS and PCE Control of Wavelength Switched Optical Networks (WSON)," draft-ietf-ccamp-rwa-wson-framework-05.txt, Feb. 1, 2010.

Lee, Y., et al., "Framework for GMPLS and PCE Control of Wavelength Switched Optical Networks (WSON)," draft-ietf-ccamp-rwa-wson-framework-06.txt, Apr. 5, 2010.

Le Roux, J.L., et al., "OSPF Protocol Extensions for Path Computation Element (PCE) Discovery," RFC 5088, Jan. 2008.

Le Roux, J.L., et al., "IS-IS Protocol Extensions for Path Computation Element (PCE) Discovery," RFC 5089, Jan. 2008.

Shiomoto, K., et al., "Requirements for GMPLS-Based Multi-Region and Multi-Layer Networks (MRN/MLN)," RFC 5212, Jul. 2008.

Bernstein, G., et al., "Routing and Wavelength Assignment Information for Wavelength Switch optical Networks," draft-bernstein-ccamp-wson-info-00.txt, Oct. 30, 2007.

Bernstein, G., et al., "Routing and Wavelength Assignment Information for Wavelength Switch optical Networks," draft-bernstein-ccamp-wson-info-01.txt, Nov. 19, 2007.

Bernstein, G., et al., "Routing and Wavelength Assignment Information for Wavelength Switch optical Networks," draft-bernstein-ccamp-wson-info-02.txt, Feb. 20, 2008.

Bernstein, G., et al., "Routing and Wavelength Assignment Information for Wavelength Switch optical Networks," draft-bernstein-ccamp-wson-info-03.txt, Jul. 7, 2011.

Bernstein, G., et al., "Routing and Wavelength Assignment Information Encoding for Wavelength Switched Optical Networks," draft-ietf-ccamp-rwa-wson-encode-00.txt, Dec. 18, 2008.

Bernstein, G., et al., "Routing and Wavelength Assignment Information Encoding for Wavelength Switched Optical Networks," draft-ietf-ccamp-rwa-wson-encode-01.txt, Mar. 3, 2009.

Bernstein, G., et al., "Routing and Wavelength Assignment Information Encoding for Wavelength Switched Optical Networks," draft-ietf-ccamp-rwa-wson-encode-02.txt, Jul. 10, 2009.

Bernstein, G., et al., "Routing and Wavelength Assignment Information Encoding for Wavelength Switched Optical Networks," draft-ietf-ccamp-rwa-wson-encode-03.txt, Oct. 8, 2009.

Bernstein, G., et al., "Routing and Wavelength Assignment Information Encoding for Wavelength Switched Optical Networks," draft-ietf-ccamp-rwa-wson-encode-04.txt, Feb. 18, 2010.

Bernstein, G., et al., "Routing and Wavelength Assignment Information Encoding for Wavelength Switched Optical Networks," draft-ietf-ccamp-rwa-wson-encode-05.txt, Jul. 12, 2010.

Sambo, N., et al., "GMPLS—Controlled Dynamic Translucent Optical Networks," IEEE Network, May/ Jun. 2009, pp. 34-40.

Sen, A., et al., "GMPLS—Controlled Dynamic Translucent Optical networks," IEEE Globecom, 2008, 6 pages.

Shen, G., et al., "Translucent Optical Networks: The way Forward," Topics in Optical Communications, IEEE Communications Magazine, Feb. 2007, pp. 48-54.

Yang, X., "Dynamic Routing in Translucent WDM Optical Networks: The Intradomain Case," Journal of Lightwave Technology, vol. 23, Mar. 2005, pp. 955-971.

Bernstein, G., et al., "WSON Signal Characteristics and Network Element Compatibility Constraints for GMPLS," Network Working Group, Internet Draft, draft-bernstein-ccamp-wson-compatibility-00.txt, Aug. 17, 2009, 30 pages.

Bernstein, G., et al., "WSON Signal Characteristics and Network Element Compatibility Constraints for GMPLS," Network Working Group, Internet Draft, draft-bernstein-ccamp-wson-compatibility-01.txt, Oct. 7, 2009, 23 pages.

Fang, L., Ed., "Security Framework for MPLS and GMPLS Networks," Network Working Group, Internet Draft, draft-ieft-mpls-mpls-and-gmpls-security-framework-09.txt, Mar. 8, 2010, 64 pages.

Imajuku, W., et al., "Routing Extensions to Support Network Elements with Switching Constraint," CCAMP Working Group, Internet Draft, draft-imajuku-ccamp-rtg-switching-constraint-02.txt, Jul. 2007, 8 pages.

Lee, Y., et al., "Path Computation Element Communication Protocol (PCEP) Requirements and Extensions for the Support of Wavelength Switched Optical Networks," Network Working Group, Internet Draft, draft-Iee-pce-wson-routing-wavelength-00.txt, Oct. 29, 2007, 21 pages.

Lee, Y., et al., "PCEP Requirements and Extensions for WSON Routing and Wavelength Assignment," Network Working Group, Internet Draft, draft-Iee-pce-wson-routing-wavelength-02.txt, Jun. 27, 2008, 17 pages.

Otani, T., et al., "Generalized Labels of Lambda-Switching Capable Label Switching Routers (LSR)," Internet Draft, draft-otani-ccamp-gmpls-lambda-labels-02.txt, Feb. 24, 2008, 11 pages.

"Series G: Transmission Systems and Media, Digital Systems and Networks, Transmission Media Characteristics—Characteristics of Optical Components and Subsystems, Transmission Characteristics of Optical Components and Subsystems," ITU-T G.671, Jan. 2005, 42 pages.

"Series G: Transmission Systems and Media, Digital Systems and Networks, Digital Networks—Optical Transport Networks, Architecture of Optical Transport Networks," ITU-T G.872, Nov. 2001, 72 pages.

"Series G: Transmission Systems and Media, Digital Systems and Networks, Optical System Design and Engineering Considerations," ITU-T Series G Supplement 39, Dec. 2008, 106 pages.

"Series G: Transmission Systems and Media, Digital Systems and Networks, Transport of IEEE 10G Base-R in Optical Transport Networks (OTN)," ITU-T Series G Supplement 43, Nov. 2006, 18 pages.

Winzer, P., et al., "Advanced Optical Modulation Formats," Proceedings of the IEEE, vol. 94, No. 5, May 2006, pp. 952-985.

Zang, H., et al., "A Review of Routing and Wavelength Assignment Approaches for Wavelength-Routed Optical WDM Networks," Optical Networks Magazine, Jan. 2000, pp. 47-60.

Katz, D., et al., "Traffic Engineering (TE) Extensions to OSPF Version 2," Network Working Group, RFC 3630, Sep. 2003, 14 pages.

Mannie, E., Ed., "Generalized Multi-Protocol Label Switching (GMPLS) Architecture," Network Working Group, RFC 3945, Oct. 2004, 69 pages.

Strand, J., Ed., et al., "Impairments and Other Constraints on Optical Layer Routing," Network Working Group, RFC 4054, May 2005, 28 pages.

Kompella, K., et al., "Link Bundling in MPLS Traffic Engineering (TE)," Network Working Group, RFC 4201, Oct. 2005, 12 pages.

Mannie, E., et al., "Generalized Multi-Protocol Label Switching (GMPLS) Extensions for Synchronous Optical Network (SONET) and Synchronous Digital Hierarchy (SDH) Control," Network Working Group, RFC 4606, Aug. 2006, 24 pages.

Vasseur, JP., Ed., "A Backward-Recursive PCE-Based Computation (BRPC) Procedure to Compute Shortest Constrained Inter-Domain Traffic Engineering Label Switched Paths," Network Working Group, RFC 5441, Apr. 2009, 19 pages.

Leroux, JL., et al., "Encoding of Objective Functions in the Path Computation Element Communication Protocol (PCEP)," Network Working Group, RFC 5541, Jun. 2009, 23 pages.

Lee, Y., et al., "Path Computation Element Communication Protocol (PCEP) Requirements and Protocol Extensions in Support of Global Concurrent Optimization," Network Working Group, RFC 5557, Jul. 2009, 27 pages.

Fang, L., Ed., "Security Framework for MPLS and GMPLS Networks," Internet Engineering Task Force (IETF), RFC 5920, Jul. 2010, 66 pages.

Ozdaglar, A., et al., "Routing and Wavelength Assignment in Optical Networks," IEEE/ACM Transactions on Networking, vol. 11, Issue 2, Apr. 2003, pp. 259-272.

Coldren, L., et al., "Tunable Semiconductor Lasers: A Tutorial," Journal of Lightwave Technology, vol. 22, No. 1, Jan. 2004, pp. 193-202.

Chu, X., et al., "Wavelength Converter Placement Under Different RWA Algorithms in Wavelength-Routed All-Optical Networks," IEEE Transactions on Communications, vol. 51, No. 4, Apr. 2003, pp. 607-617.

Basch, E., et al., "Architectural Tradeoffs for Reconfigurable Dense Wavelength-Division Multiplexing Systems," IEEE Journal of Selected Topics in Quantum Electronics, vol. 12, No. 4, Jul./Aug. 2006, pp. 615-626.

Buus, J., et al., "Tunable Lasers in Optical Networks," Journal of Lightwave Technology, vol. 24, No. 1, Jan. 2006, pp. 5-11.

Foreign Communication From a Related Counterpart Application, European Application No. 11741912.7, Extended European Search Report dated Dec. 10, 2012, 9 pages.

Lee, Y., et al., "Routing and Wavelength Assignment Information Model for Wavelength Switched Optical Networks," Network Working Group, Internet Draft, draft-ietf-ccamp-rwa-info-04.txt, Sep. 9, 2009, 20 pages.

Lee, Y., et al., "Routing and Wavelength Assignment Information Model for Wavelength Switched Optical Networks," Network Working Group, Internet Draft, draft-ietf-ccamp-rwa-info-09.txt, Sep. 3, 2010, 52 pages.

Kompella, K, Ed., et al., "Intermediate System to Intermediate System (IS-IS) Extensions in Support of Generalized Multi-Protocol Label Switching (GMPLS)," Network Working Group, RFC 4205, Oct. 2005, 12 pages.

"Series G: Transmission Systems and Media, Digital Systems and Networks, Digital Sections and Line System—Digital Line Systems, Optical Transport Network Physical Layer Interfaces," ITU-T G.959. 1, Mar. 2008, 72 pages.

"Series G: Transmission Systems and Media, Digital Systems and Networks, Digital Sections and Line System—Digital Line Systems, Optical Transport Network Physical Layer Interfaces," ITU-T G.959. 1, Nov. 2009, 74 pages.

Notice of Allowance dated Apr. 22, 2013, 25 pages, U.S. Appl. No. 12/898,778, filed Oct. 6, 2010.

* cited by examiner

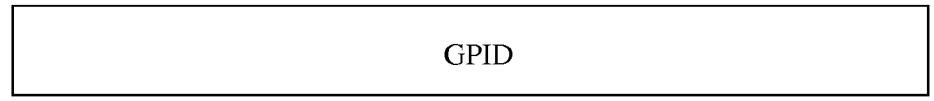
FIG. 12
FIG. 13
FIG. 14
FIG. 15

US 8,532,484 B2

METHOD FOR ROUTING AND WAVELENGTH ASSIGNMENT INFORMATION ENCODING FOR WAVELENGTH SWITCHED OPTICAL NETWORKS

CROSS-REFERENCE TO RELATED APPLICATIONS

The present application claims the benefit of U.S. Provisional Patent Application No. 61/303,380 filed Feb. 11, 2010 by Young Lee et al. and entitled "Method for Routing and Wavelength Assignment Information Encoding for Wavelength Switched Optical Networks," and is a continuation-in-part of U.S. patent application Ser. No. 12/898,778 filed Oct. 6, 2010 by Young Lee et al. and entitled "Method for Characterizing Wavelength Switched Optical Network Signal Characteristics and Network Element Compatibility Constraints for Generalized Multi-Protocol Label Switching," which claims the benefit of U.S. Provisional Patent Application No. 61/249,206 filed Oct. 6, 2009 by Young Lee et al. and entitled "Method for Characterizing WSON Signal Characteristics and Network Element Compatibility Constraints for GMPLS," and U.S. Provisional Patent Application No. 61/252,982 filed Oct. 19, 2009 by Young Lee et al. and entitled "Method for Path Computation Element Communication Protocol (PCEP) to Support Signal Compatibility and Processing Constraints," all of which are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wavelength division multiplexing (WDM) is one technology that is envisioned to increase bandwidth capability and enable bi-directional communications in optical networks. In WDM networks, multiple data signals can be transmitted simultaneously between network elements (NEs) using a single fiber. Specifically, the individual signals may be assigned different transmission wavelengths so that they do not interfere or collide with each other. The path that the signal takes through the network is referred to as the lightpath. One type of WDM network is a wavelength switched optical network (WSON) in which switching is performed selectively based on the wavelength of an optical signal. A WSON seeks to switch the optical signals with fewer optical-electrical-optical (OEO) conversions along the lightpath, e.g. at the individual NEs, than existing optical networks. One of the challenges in implementing WSONs is the determination of the routing and wavelength assignment (RWA) for the various signals that are being transported through the network at any given time. To implement RWA, various NE related information can be forwarded from a Path Computation Client (PCC), such as a NE, and received and processed at a Path Computation Element (PCE).

SUMMARY

In one embodiment, the disclosure includes an apparatus comprising a NE configured to communicate at least one of signal constraints and processing capabilities for a plurality of resource blocks (RBs) associated with a network node in a WSON node Type-Length-Value (TLV) and signal constraints and processing capabilities associated with a link in a WSON link TLV, wherein the WSON node TLV comprises a node identifier (ID), one or more Generalized Multi-Protocol Label Switching (GMPLS) TLVs, a connectivity matrix TLV, and a resource pool TLV, and wherein the WSON link TLV comprises a link ID, one or more GMPLS TLVs, and a port wavelength restriction TLV.

In another embodiment, the disclosure includes a network component comprising a transmitter unit configured to transmit a RB descriptor Type-Length-Value (TLV), a RB accessibility TLV, a resource range restriction TLV, and a resource usage state TLV that each comprise a RB set field via GMPLS routing.

In yet another embodiment, the disclosure includes a method comprising receiving a RB descriptor TLV that comprises a RB set field that indicates signal constraints and processing capabilities associated with a plurality of RBs that correspond to a resource pool or a NE, a number of RBs field that indicates the number of included RBs, a modulation type list TLV, a Forward Error Correction (FEC) type list TLV, a client signal type TLV, a bit rate range list TLV, and a processing capability list TLV, and performing a path calculation based on the information in the RB descriptor TLV, the RB accessibility TLV, the resource range restriction TLV, and the resource usage state TLV.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 12 is a schematic diagram of an embodiment of a General Protocol Identifier (GPID) type TLV.

FIG. 13 is a schematic diagram of an embodiment of a modulation type TLV.

FIG. 14 is a schematic diagram of an embodiment of a FEC type TLV.

FIG. 15 is a schematic diagram of an embodiment of a regeneration point TLV.

DETAILED DESCRIPTION

Figure 1:
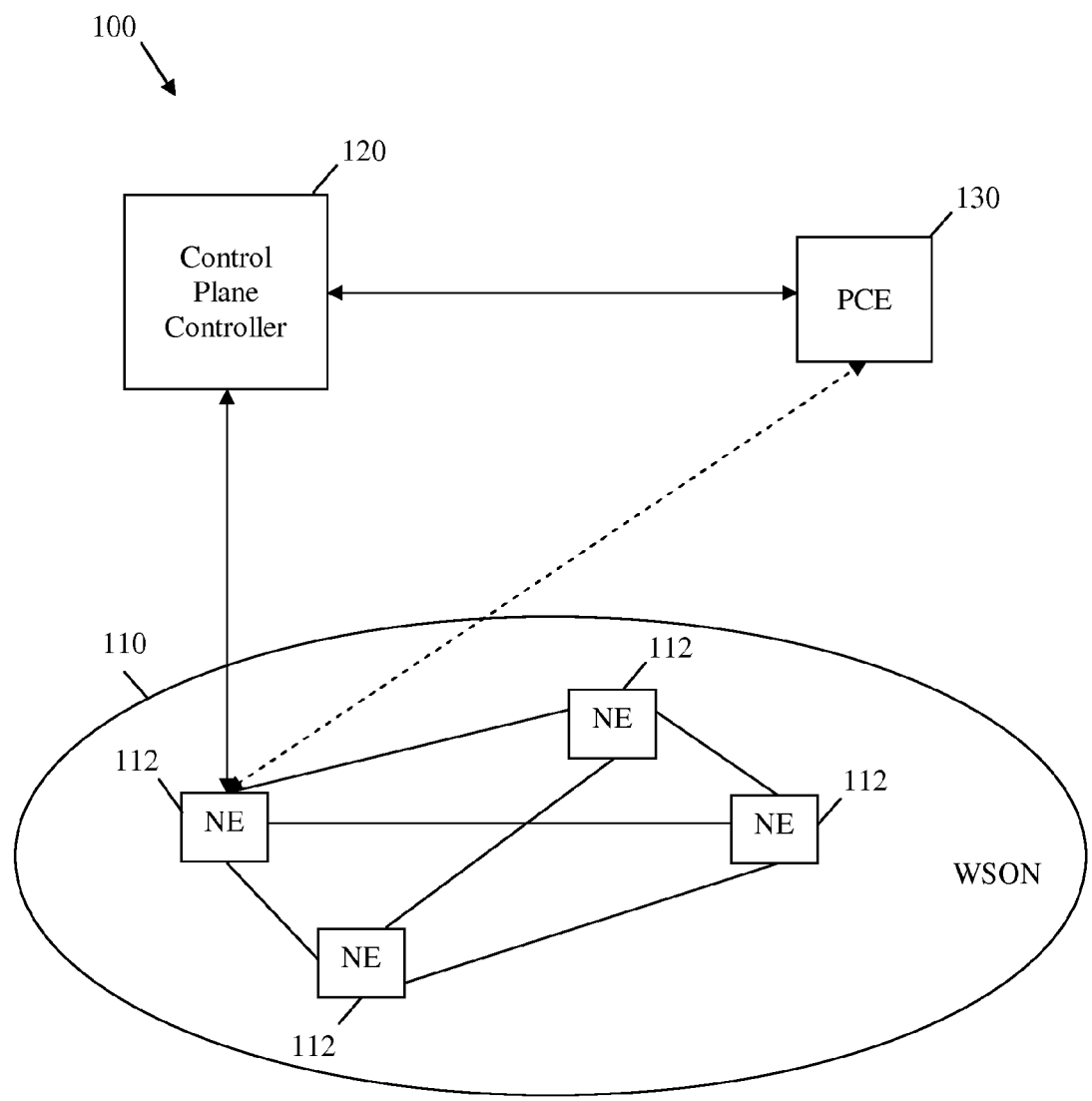
FIG. 1 is a schematic diagram of an embodiment of a WSON system.

It should be understood at the outset that although an illustrative implementation of one or more embodiments are provided below, the disclosed systems and/or methods may be implemented using any quantity of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

GMPLS for WSON may support a plurality of types of wavelength switching systems. However, for some transparent or multi-wavelength optical systems and hybrid electro-optical systems, the GMPLS control plane may be restricted to processing WSON signals with specific characteristics or attributes. The hybrid electro-optical systems may include optical-electrical-optical (OEO) switches, regenerators, and/or wavelength converters. For example, the WSON may comprise a limited quantity of NEs that may be configured to process one compatible class of signals. Such a scenario may limit the WSON flexibility and prevent the efficient use of some NEs, such as regenerators, OEO switches, and wavelength converters. In some cases, the processing capability of some NEs may not be directly supported or used during signal routing. For example, performing a regeneration function on a signal may require provisioning during the optical path establishment process.

Disclosed herein is a system and method for extending the GMPLS control plane to allow different signal types in WSONs or WDM networks based on compatibility constraints. The GMPLS control plane may be extended by providing WSON signal definition and attributes characterization. The system and method may also describe the NE compatibility constraints for a set of NEs, such as hybrid electro-optical or regenerator systems. The compatibility constraints, including signal characterization and the NE compatibility constraints, may be used to provide enhanced provisioning support in the network and enable GMPLS routing and signaling for the NEs. The compatibility constraints may also be used to enable a PCE to compute optical lightpaths according to signal compatibility constraints. Also disclosed is a method that enables signal compatibility and processing constraints in PCE protocol (PCEP) for WSONs. Accordingly, a PCE may provide path computation based on the compatibility constraints, which may allow a plurality of NEs to process signals with specific characteristics and attributes.

Further, to implement path computation and establish label switched paths (LSPs) in WSONs, a plurality of information elements may be needed, such as described in the Internet Engineering Task Force (IETF) document draft-ietf-ccamp-rwa-info.txt, which is incorporated herein by reference. The document describes an information model that may be required at some points (e.g. nodes) in the WSON. Some parts of the information model may comprise aspects of general applicability to different network technologies. Other parts of the information model may be specific to WSONs. Disclosed herein is a system and method for information encoding of a plurality of information elements for WSONs. The information encoding may be used for routing and wavelength assignment and may extend GMPLS signaling and routing protocols in the WSONs. The routing and wavelength assignment information encoding may be used to communicate routing and wavelength assignment between NEs and/or to a PCE in charge of computing paths or LSPs across the WSON nodes. The routing and wavelength assignment information encoding may provide the WSON accurate analysis of the control plane communications and/or processing loads.

FIG. 1 illustrates one embodiment of a WSON system 100. The system 100 may comprise a WSON 110, a control plane controller 120, and a PCE 130. The WSON 110, control plane controller 120, and PCE 130 may communicate with each other via optical, electrical, or wireless means. The WSON 110 may be any optical network that uses active or passive components to transport optical signals. For instance, the WSON 110 may be part of a long haul network, a metropolitan network, or a residential access network. The WSON 110 may implement WDM to transport the optical signals through the WSON 110, and may comprise various optical components including a plurality of NEs 112, which may be coupled to one another using optical fibers. In an embodiment, the optical fibers may also be considered NEs 112. The optical signals may be transported through the WSON 110 over lightpaths that may pass through some of the NEs 112. In addition, some of the NEs 112, for example those at the ends of the WSON 110, may be configured to convert between electrical signals from external sources and the optical signals used in the WSON 110. Although four NEs 112 are shown in the WSON 110, the WSON 110 may comprise any quantity of NEs 112.

The NEs 112, also referred to as nodes, may be any devices or components that transport signals through the WSON 110. In an embodiment, the NEs 112 may consist essentially of optical processing components, such as line ports, add ports, drop ports, transmitters, receivers, amplifiers, optical taps, and so forth, and do not contain any electrical processing components. Alternatively, the NEs 112 may comprise a combination of optical processing components and electrical processing components. At least some of the NEs 112 may be configured with wavelength converters, optical-electrical (OE) converters, electrical-optical (EO) converters, OEO converters, or combinations thereof. However, it may be advantageous for at least some of the NEs 112 to lack such converters, as such may reduce the cost and complexity of the WSON 110. In specific embodiments, the NEs 112 may comprise optical switches such as optical cross connects (OXCs), photonic cross connects (PXCs), type I or type II reconfigurable optical add/drop multiplexers (ROADMs), wavelength selective switches (WSSs), fixed optical add/drop multiplexers (FOADMs), or combinations thereof.

Some NEs 112 may be used for wavelength-based switching by forwarding, adding, or dropping any or all of the wavelengths that are used to transmit the optical signals. For instance, the NE 112 may comprise a plurality of ingress ports, such as line side ingress ports or add ports, a plurality of egress ports, such as line side egress ports or drop ports, or combinations thereof. The add ports and drop ports may also be called tributary ports. The optical signals handled by these various ports may comprise one or a plurality of optical wavelengths. The line side ingress ports may receive the optical signals and send some or all of the optical signals to the line side egress ports, which may in turn transmit the optical signals. Alternatively, the line side ingress ports may redirect some or all of the optical signals to the drop ports, which may drop the optical signals, for example, by transmitting the optical signals outside the optical fibers. The add ports may receive additional optical signals and send the optical signals to some of the line side egress ports, which may in turn transmit the optical signals.

In some instances, the NE 112 may comprise at least one colored port that may be an ingress port or an egress port, which may receive or transmit, respectively, the optical signal at a fixed optical wavelength or a limited range of optical wavelengths, e.g. less then a full range of wavelengths as defined by a standard, such as the course WDM (CWDM) or dense WDM (DWDM) standards, which are discussed below. Additionally or alternatively, the NE may comprise at least one colorless port that may be an ingress port or an egress port, which may receive or transmit, respectively, the optical signal at any one of a plurality of different wavelengths, e.g. a full range of wavelengths as defined by a standard, such as CWDM or DWDM. The NE 112 that comprises a colorless port and supports any or a plurality of variable wavelengths may be referred to as a colorless NE. Alternatively, the NE 112 that does not comprise a colorless port and supports one or a plurality of predetermined (or specified) wavelengths may be referred to as a colored NE. Further, the NE 112 may comprise one or a plurality of wavelength converters (WCs) that may convert one or a plurality of wavelengths between at least one ingress port and one egress port. For instance, a WC may be positioned between an ingress port and an egress port and may be configured to convert a first wavelength received at the ingress port into a second wavelength, which may then be transmitted at the egress port. The WC may comprise any quantity of optical and/or electrical components that may be configured for wavelength conversion, such as an OEO converter and/or a laser.

The NEs 112 may be coupled to each other via optical fibers, also referred to as links. The optical fibers may be used to establish optical links and transport the optical signals between the NEs 112. The optical fibers may comprise standard single mode fibers (SMFs) as defined in International Telecommunication Union (ITU) Telecommunication Standardization Sector (ITU-T) standard G.652, dispersion shifted SMFs as defined in ITU-T standard G.653, cut-off shifted SMFs as defined in ITU-T standard G.654, non-zero dispersion shifted SMFs as defined in ITU-T standard G.655, wideband non-zero dispersion shifted SMFs as defined in ITU-T standard G.656, or combinations thereof. These fiber types may be differentiated by their optical impairment characteristics, such as attenuation, chromatic dispersion, polarization mode dispersion, four wave mixing, or combinations thereof. These effects may be dependent upon wavelength, channel spacing, input power level, or combinations thereof. The optical fibers may be used to transport WDM signals, such as CWDM signals as defined in ITU-T G.694.2 or DWDM signals as defined in ITU-T G.694.1. All of the standards described in this disclosure are incorporated herein by reference.

The control plane controller 120 may coordinate activities within the WSON 110. Specifically, the control plane controller 120 may receive optical connection requests and provide lightpath signaling to the WSON 110 via an Interior Gateway Protocol (IGP) such as Generalized Multi-Protocol Label Switching (GMPLS), thereby coordinating the NEs 112 such that data signals are routed through the WSON 110 with little or no contention. In addition, the control plane controller 120 may communicate with the PCE 130 using PCEP to provide the PCE 130 with information that may be used for the RWA, receive the RWA from the PCE 130, and/or forward the RWA to the NEs 112. The control plane controller 120 may be located in a component outside of the WSON 110, such as an external server, or may be located in a component within the WSON 110, such as a NE 112.

The PCE 130 may perform all or part of the RWA for the WSON system 100. Specifically, the PCE 130 may receive wavelength and/or other information that may be used for the RWA from the control plane controller 120, from the WSON 110, or both. The wavelength information may comprise port wavelength restrictions for the NE 112, such as for a colored NE that comprises a colored port. The PCE 130 may process the information to obtain the RWA, for example, by computing the routes, e.g. lightpaths, for the optical signals, specifying the optical wavelengths that are used for each lightpath, and determining the NEs 112 along the lightpath at which the optical signal should be converted to an electrical signal or a different wavelength. The RWA data may include at least one route for each incoming signal and at least one wavelength associated with each route. The PCE 130 may then send all or part of the RWA data to the control plane controller 120 or directly to the NEs 112. To assist the PCE 130 in this process, the PCE 130 may comprise a global traffic-engineering database (TED), a RWA information database, an optical performance monitor (OPM), a physical layer constraint (PLC) information database, or combinations thereof. The PCE 130 may be located in a component outside of the WSON 110, such as an external server, or may be located in a component within the WSON 110, such as a NE 112.

In some embodiments, the RWA information may be sent to the PCE 130 by a PCC. The PCC may be any client application requesting a path computation to be performed by the PCE 130. The PCC may also be any network component that makes such a request, such as the control plane controller 120, or any NE 112, such as a ROADM or a FOADM.

Figure 2:
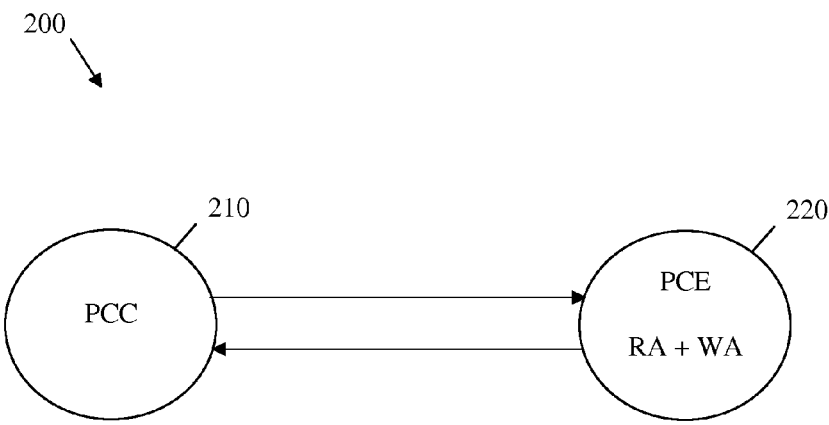
FIG. 2 is a schematic diagram of an embodiment of a combined RWA architecture.

FIG. 2 illustrates an embodiment of a combined RWA architecture 200. In the combined RWA architecture 200, the PCC 210 communicates the RWA request and the required information to the PCE 220, which implements both the routing assignment and the wavelength assignment functions using a single computation entity, such as a processor. For example, the processor may process the RWA information using a single or multiple algorithms to compute the lightpaths as well as to assign the optical wavelengths for each lightpath. The amount of RWA information needed by the PCE 220 to compute the RWA may vary depending on the algorithm used. If desired, the PCE 220 may not compute the RWA until sufficient network links are established between the NEs or when sufficient RWA information regarding the NEs and the network topology is provided. The combined RWA architecture 200 may be preferable for network optimization, smaller WSONs, or both.

Figure 3:
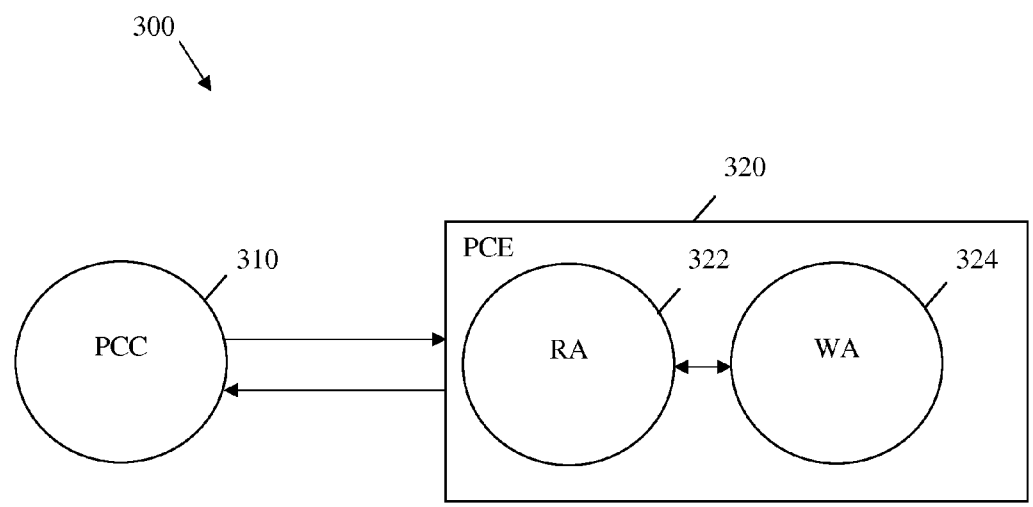
FIG. 3 is a schematic diagram of an embodiment of a separated RWA architecture.

FIG. 3 illustrates an embodiment of a separated RWA architecture 300. In the separated RWA architecture 300, the PCC 310 communicates the RWA request and the required information to the PCE 320, which implements both the routing function and the wavelength assignment function using separate computation entities, such as processors 322 and 324. Alternatively, the separated RWA architecture 300 may comprise two separate PCEs 320 each comprising one of the processors 322 and 324. Implementing routing assignment and wavelength assignment separately may offload some of the computational burden on the processors 322 and 324 and reduce the processing time. In an embodiment, the PCC 310 may be aware of the presence of only one of two processors 322, 324 (or two PCEs) and may only communicate with that processor 322, 324 (or PCE). For example, the PCC 310 may send the RWA information to the processor 322, which may compute the lightpath routes and forward the routing assignment to the processor 324 where the wavelength assignments are performed. The RWA may then be passed back to the processor 322 and then to the PCC 310. Such an embodiment may also be reversed such that the PCC 310 communicates with the processor 324 instead of the processor 322.

In either architecture 200 or 300, the PCC 210 or 310 may receive a route from the source to destination along with the wavelengths, e.g. GMPLS labels, to be used along portions of the path. The GMPLS signaling supports an explicit route object (ERO). Within an ERO, an ERO label sub-object can be used to indicate the wavelength to be used at a particular NE. In cases where the local label map approach is used, the label sub-object entry in the ERO may have to be translated.

Figure 4:
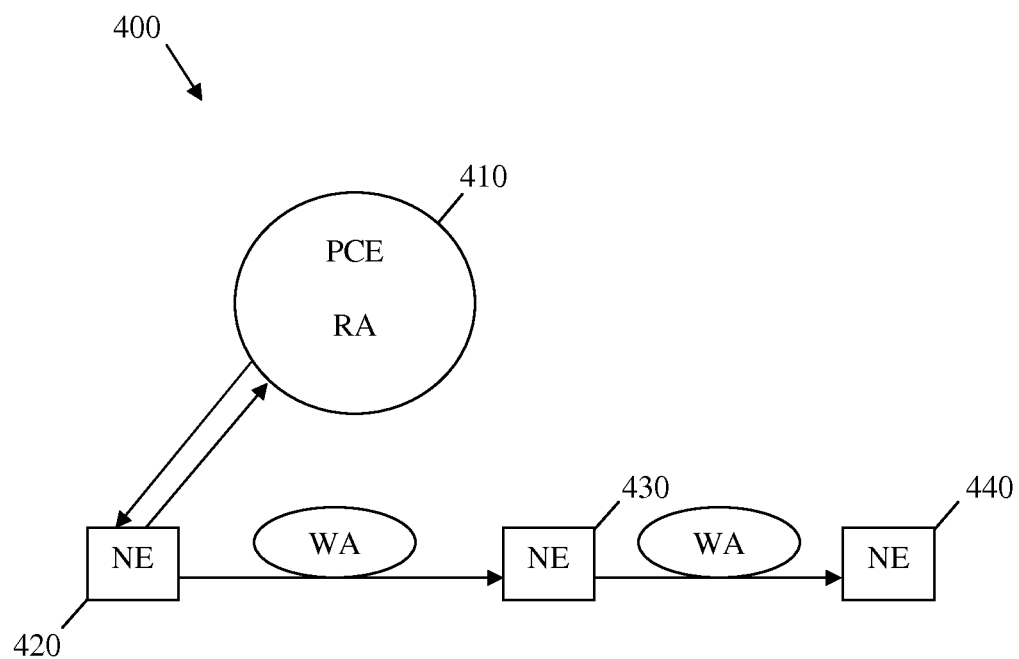
FIG. 4 is a schematic diagram of an embodiment of a distributed wavelength assignment architecture.

FIG. 4 illustrates a distributed wavelength assignment architecture 400. In the distributed wavelength assignment architecture 400, the PCE 410 may receive some or all of the RWA information from the NEs 420, 430, and 440, perhaps via direct link, and implements the routing assignment. The PCE 410 then directly or indirectly passes the routing assignment to the individual NEs 420, 430, and 440, which assign the wavelengths at the local links between the NEs 420, 430, and 440 based on local information. Specifically, the NE 420 may receive local RWA information from the NEs 430 and 440 and send some or all of the RWA information to the PCE 410. The PCE 410 may compute the lightpaths using the received RWA information and send the list of lightpaths to the NE 420. The NE 420 may use the list of lightpaths to identify the NE 430 as the next NE in the lightpath. The NE 420 may establish a link to the NE 430 and use the received local RWA information that may comprise additional constraints to assign a wavelength for transmission over the link. The NE 430 may receive the list of lightpaths from the NE 420, use the list of lightpaths to identify the NE 440 as the next NE in the lightpath, establish a link to the NE 440, and assign the same or a different wavelength for transmission over the link. Thus, the signals may be routed and the wavelengths may be assigned in a distributed manner between the remaining NEs in the network. Assigning the wavelengths at the individual NEs may reduce the amount of RWA information that has to be sent to the PCE 410.

Figure 5:
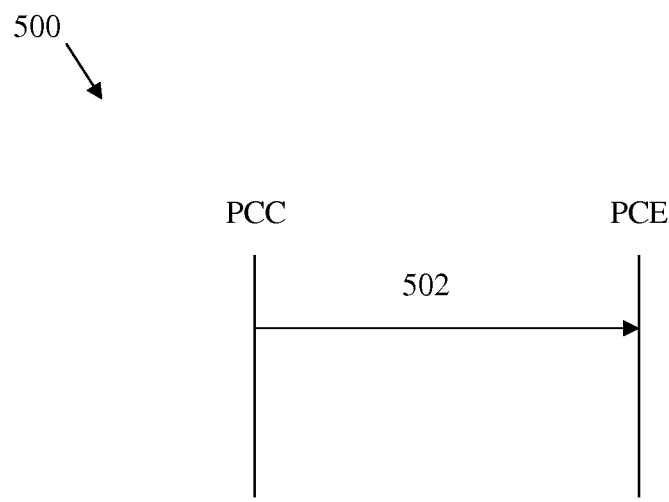
FIG. 5 is a protocol diagram of an embodiment of a PCC and PCE communication method.

FIG. 5 illustrates an embodiment of a communication method 500 between the PCC and the PCE. In the method 500, the PCC sends a message 502 to the PCE, where the message 502 comprises at least some of the RWA information described below. The message 502 may also contain a status indicator that indicates whether the RWA information is static or dynamic. In an embodiment, the status indicator may indicate how long the static or dynamic status lasts so that the PCE can know how long the RWA information is valid and/or when to expect an update. Additionally or alternatively, the message 502 may contain a type indicator that indicates whether the RWA information is associated with a node that may comprise a NE, a link, such as a WDM link, or both. In some instances, an acknowledgement message that confirms receipt of the message 502 may be sent from the PCE to the PCC, e.g. subsequent to receipt of the message 502.

The method 500 may be implemented using any suitable protocol, such as the IGP. The IGP may be a routing protocol used for exchanging route information among gateways, such as a host computer or routers, in an autonomous network. Internet networks can be divided into multiple domains or multiple autonomous systems, where one domain congregates a batch of host computers and routers that employ the same routing protocol. In such a case, the IGP may be provided for selecting routes in a domain. The IGP may be link-state routing protocol in that each node possesses information regarding the complete network topology. In such a case, each node can independently calculate the best next hop from it for every possible destination in the network using local information of the topology. The collection of best next hops may form the routing table for the node. In a link-state protocol, the only information that may be passed between the nodes is information used to construct the connectivity maps. Examples of suitable IGPs include GMPLS, open shortest path first (OSPF), and intermediate system to intermediate system (IS-IS).

As mentioned above, the message 502 may comprise RWA information that may be exchanged between the PCC and the PCE. The RWA information may also be exchanged, e.g. via signaling, between any of the NEs and/or between the NEs and the PCE. In an embodiment, the exchanged RWA information may comprise information about WSON signal definition or characterization, for example a plurality signal attributes. The RWA information may also comprise a plurality of NE compatibility constraints. For instance, some of the NEs in the WSON may have constraints on the types of signals that may be supported. The compatibility constraints, including the signal attributes and the NE compatibility constraints, may be used to determine the different signals that may be processed by the different NEs, such as for path computation purposes.

Some switching systems at the NEs may process multiple wavelengths at a time. However, the individual ports, transmitters, and/or receivers in the NEs may transmit/receive single wavelengths at a time, which may represent single channel interfaces. For instance, an NE may comprise an optical switch with multiple ports that each transmits/receives a single wavelength at a time, and thus corresponds to a single channel interface. The WSONs may include DWDM networks based on single channel interfaces, such as defined in ITU-T recommendations G.698.1 and G.698.2, both of which are incorporated herein by reference. G.698.1 and G.698.2 also define non-impairment related parameters including: (a) minimum channel spacing in Gigahertz (GHz); (b) bit rate/line coding (modulation) of tributary signals; and (c) minimum and maximum central frequency. The minimum channel spacing and the minimum and maximum central frequency may be related to link properties and are modeled in IETF documents draft-ietf-ccamp-gmpls-g-694-lambda-labels-04.txt, draft-bernstein-ccamp-wson-g-info-03.txt, and draft-ietf-ccamp-rwa-wson-framework-06.txt (collectively hereinafter, WSON framework), all of which are incorporated herein by reference. Bit rate/line coding or modulation of tributary signals may be related to signal properties that are exchanged between the NEs.

The single channel interfaces are also described in ITU-T specifications G.698.1, G.698.2, and G.959.1, also incorporated herein by reference. G.698.1, G.698.2, and G.959.1 define a concept of an "optical tributary signal" as a single channel signal that is placed within an optical channel for transport across the optical network. The use of the term "tributary" specifies a single channel entity instead of a multi-channel optical signal. There is a plurality of defined types of optical tributary signals, known as "optical tributary signal classes." The optical tributary signals are each characterized in G.959.1 by a modulation format and bit rate range and include: (a) optical tributary signal class non-return-to-zero modulation (NRZ) 1.25 GHz (G); (b) optical tributary signal class NRZ 2.5 G; (c) optical tributary signal class NRZ 10 G; (d) optical tributary signal class NRZ 40 G; and (e) optical tributary signal class return-to-zero modulation (RZ) 40 G. Further, G.698.2 requires specifying the bit rate of the optical tributary signal. With further advances in technology, more optical tributary signal classes may be added to the standards. For example, a plurality of non-standardized advanced modulation formats are deployed at the 40 G rate, including Different Phase Shift Keying (DPSK) and Phase Shaped Binary Transmission (PSBT).

An optical tributary signal may be assigned to an optical communication channel, e.g. for a link or NE in the WSON. The optical tributary signal may correspond to a label switched path (LSP) in GMPLS. The assigned WSON signal may have a plurality of characteristics or attributes including: (1) optical tributary signal class or modulation format; (2) FEC, such as whether FEC is used in the digital stream and what type of FEC is used; (3) center frequency or wavelength; (4) bit rate; and (5) GPID for the information format. Such signal characteristics or attributes may be needed to implement path selection and/or RWA implementation, e.g. to choose a compatible path. Accordingly, the WSON signal attributes or characteristics may be part of the RWA information exchanged between a PCC, a PCE, and/or a NE, such using IGP or GMPLS. For example, the WSON signal attributes or characteristics may be exchanged in the message 502.

The optical tributary signal class, FEC, and center frequency may vary as the signal traverses the network and is processed or converted by generators, OEO switches, and/or WCs. The wavelength conversion may be supported in GMPLS. The bit rate and GPID may not change since they both describe the encoded bit stream. A set of GPID values may be defined for lambda or wavelength switching, such as described in IETF Request for Comments (RFC) 3471 and RFC 4328, both of which are incorporated herein by reference. Further, there may be a plurality of "pre-standard" or proprietary modulation formats and FEC codes used in WSONs. The presence of FEC in a signal may also be detected for some bit streams, such as described in ITU-T G.707, which is incorporated herein by reference. The presence of FEC in the signal may be indicated by a FEC status indication (FSI) byte in the signal or according to ITU-T G.709, which is incorporated herein by reference, may be inferred by verifying whether a FEC field of an optical channel transport unit-k (OTUk) comprises all zeros.

Some transparent optical systems and/or hybrid electro-optical systems, such as OEO switches, WCs, and regenerators, may have a plurality of similar properties. Such NEs may be "transparent" to an optical signal depending on their functionality and/or implementation. The regenerators may implement various regeneration schemes, such as discussed in ITU-T G.872 Annex A, which is incorporated herein by reference. Based on their functionalities, the regenerators may correspond to different categories or classes of generators: 1R; 2R; and 3R, as described in Table 1 below.

1R regenerators may be independent of signal modulation format (or line coding), but may operate over a relatively limited range of wavelengths/frequencies. 2R generators may be applied to signal digital streams, dependent upon the modulation format, and limited to some extent to a range of bit rates but not necessarily to a specific bit rate. 3R generators may be applied to signal channels, dependent upon the modulation format, and sensitive to the bit rate of the digital signals. For example, a 3R generator may be designed to handle a specific bit rate or may be programmed to receive and regenerate a specific bit rate.

1R, 2R, and 3R regenerators may not substantially modify the bit stream in the optical or electrical signal. However, the bit stream may be slightly modified for performance monitoring and fault management purposes. Some existing networks, such as Synchronous Optical Networking (SONET), Synchronous Digital Hierarchy (SDH), and ITU-T G.709 based networks, may use a digital signal envelope for the bit stream between 3R regenerators. The digital signal envelope may be referred to as a section signal in SONET, a regenerator section signal in SDH, and OTUk in G.709. A portion of the frame structure in the signals (e.g. overhead) may be reserved for use by the regenerators. The overhead portion is summarized in Table 2.

TABLE 1

Regenerator classes and associated functionality.

| Regenerator Type | Functions |
| --- | --- |
| 1R | Equal amplification of all frequencies within the amplification bandwidth. |
|  | There is no restriction upon information formats. Amplification with different gain for frequencies within the amplification bandwidth. This could be applied to both single channel and multi-channel systems. |
|  | Dispersion compensation (phase distortion). This analogue process can be applied in either single-channel or multi-channel systems. |
| 2R | Any or all 1R functions. Noise suppression. Digital reshaping (Schmitt Trigger function) with no clock recovery. This is applicable to individual channels and can be used for different bit rates but is not transparent to line coding (modulation). |
| 3R | Any or all 1R and 2R functions. Complete regeneration of the pulse shape including clock recovery and retiming within required jitter limits |

Table 2 shows current support for frame alignment, signal identification, and FEC at a WSON layer. However, the GMPLS control plane may not provide switching or multiplexing at the WSON layer to simplify the GMPLS control plane. The GMPLS control plane may provide the management functions in Table 2 in the WSON layer but may require a multi-layer implementation to provide switching functionalities. As such, existing technologies that may support additional management layers may be ignored by the GMPLS control plane, and for example may be implemented instead at a management plane. In an embodiment, the WSON layer of the GMPLS control plane may be configured to support at least some functionality for regenerators and other NEs for switching and/or multiplexing. The additional supported functionality may substitute for using multi-layer or higher layer switching, e.g. at a management layer instead of the control plane layer.

TABLE 2

SONET, SDH, and G.709 regenerator related overhead.

| Function | SONET/SDH Regenerator Section | ITU-T G.709 OTUk |
|---|---|---|
| Signal Identifier | J0 (section trace) | Trail Trace Identifier (TTI) |
| Performance Monitoring | BIP-8 (B1) | BIP-8 (within SM) |
| Management Communications | D1-D3 bytes | GCC0 (general communications channel) |
| Fault Management | A1, A2 framing bytes | frame alignment signal (FAS), backward defect indication (BDI), backward error indication (BEI) |
| FEC | P1, Q1 bytes | OTUk FEC |

Some of the regenerator functionality may be supported at the WSON layer by specifying or indicating a plurality of regenerator compatibility constraints for the different class generators 1R, 2R, and 3R. Table 3 shows a plurality of regenerator compatibility constraints, including limited wavelength range, modulation type restriction, bit rate range restriction, specific or exact bit rate restriction, and client signal dependence. For example, 1R, 2R, and 3R regenerators may have a limited wavelength range, 2R and 3R regenerators may also have a modulation type restriction and a bit rate restriction, and additionally 3R regenerators may have an exact or specific bit rate restriction and a client signal dependence. The limited wavelength range constraint may be modeled in current GMPLS implementation and the modulation type restriction constraint may indicate FEC support.

TABLE 3

Regenerators compatibility constraints.

| Constraints | 1R | 2R | 3R |
|---|---|---|---|
| Limited Wavelength Range | X | X | X |
| Modulation Type Restriction | | X | X |
| Bit Rate Range Restriction | | X | X |
| Exact Bit Rate Restriction | | | X |
| Client Signal Dependence | | | X |

The WSON switches that use or comprise regenerators may also perform OEO processing or switching, such as OEO switches. A vendor may add a regenerator to a switching system for various purposes. For example, the regenerator may restore signal quality either before or after optical processing (e.g. switching). The optical signal may also be converted to an electrical signal for switching and then reconverted to an optical signal prior to egress from the switch. As such, signal regeneration may be applied to adapt the signal to the switch fabric, e.g. regardless of whether regeneration is needed to maintain signal quality. In any such cases, the OEO switches may have substantially similar compatibility constraints as the regenerator compatibility constraints above. Thus, the compatibility constraints above (in Table 3) may be used to support both regenerator and OEO switch functionality in the GMPLS control plane layer.

WCs may be configured to receive one or more optical channels, e.g. at specific wavelengths, and convert them to corresponding new specific wavelengths. WCs may not have been widely deployed. For instance, in some current systems, wavelength converters are based on demodulating an incoming optical signal into an electrical signal and re-modulating the electrical signal into a new optical signal, e.g. using OEO processing. Such process may be similar to that of regenerators, except that the output signal wavelength may be different than the input signal wavelength. Therefore, the WCs may have signal processing restrictions substantially similar to regenerators and OEO switches. Thus, the NE compatibility constraints above (in Table 3) may also be used to support WC functionality in the GMPLS control plane layer. Additionally, the WC compatibility constraints may comprise an input frequency (or wavelength) range restriction and an output frequency restriction, which may be more restrictive than the supported WDM link range. Such restriction may be modeled as described in draft-ietf-ccamp-gmpls-g-694-lambda-labels-04.txt and draft-ietf-ccamp-rwa-wson-framework-06.txt, both of which are incorporated herein by reference.

The above regenerator compatibility constraints, including the additional WC compatibility constraints, may be needed to implement path selection and/or RWA implementation. Thus, the regenerator or NE compatibility constraints may be exchanged in the WSON using IGP or GMPLS, for example in the message 502. Additionally, the regenerators, OEO switches, WCs, and/or other NEs may be characterized using a plurality of NE functional constraints, which may also be part of the exchanged RWA information. The additional functional constraints may comprise input constraints, output constraints, and processing capabilities. The input constraints may be associated with a received signal and comprise: (1) acceptable modulation restrictions; (2) client signal (e.g. GPID) restrictions; (3) bit rate restrictions; (4) FEC coding restrictions; and (5) configurability, which may indicate one of (a) none, (b) self-configuring, and (c) required.

The NE may need provisioning to accept signals with some attributes and reject signals with other attributes. For example, the 2R generator may be provisioned to receive only signals that match its bit rate restrictions. Alternatively, some of the NEs may be configured to auto-detect some signal attributes and accordingly configure themselves. For example, the 3R generator may use a detection mechanism and/or a phase locking circuitry to detect the signal's bit rate and adapt accordingly. The configurability functional constraint may be used to characterize the NE's configurability. The input constraints above may be applied to a source NE or a sink NE for the transported signal.

The output constraints may be associated with a transmitted signal from the NE, which may not modify the signal bit rate or the type of the client signal. However, the NE may modify the modulation format of the FEC code of the signal. The output constraints may comprise: (1) output modulation that may be by default the same as the input modulation; (2) a limited set of available output modulations; (3) output FEC that may be the same as the input FEC; and (4) a limited set of available output FEC codes. If there is more than one choice in the output modulation and/or output FEC codes, then the NE may be configured on a per LSP basis for each selected choice.

The processing capabilities may be associated with functionality of the NEs. In an embodiment, the processing capability may specify regeneration capabilities of regenerators, OEO switches, and/or WCs. The processing capabilities may include: (a) regeneration, such as for different regenerator classes; (b) fault and performance monitoring; (c) wavelength conversion; and (d) switching. The wavelength conversion and switching capabilities may be supported in GMPLS and WSON framework. The regeneration capability may indicate whether a NE is or is not capable of performing signal regeneration. Some NEs may have limited regeneration capability for specific signals traversing the NEs, such as in a shared pool of NEs.

The regeneration capability per link or a node may be specified by indicating at least: (1) regeneration capability, which may correspond to one of (a) fixed, (b) selective, and (c) none; (2) regeneration type, such as 1R, 2R, or 3R; and (3) regeneration pool properties for the case of selective regeneration, which may comprise ingress and egress restrictions and availability. The properties of a shared pool of NEs, such as shared generator pools, may be substantially similar to the properties of WC pools in the draft-ietf-ccamp-rwa-wson-framework-06.txt.

The fault and performance monitoring capability may be handled outside the GMPLS control plane. However, when the NEs' operations are performed on a LSP basis, the control plane may assist in the fault and performance monitoring configuration process. For example, fault and performance monitoring may include setting up a section trace, e.g. in a generator overhead identifier, between two NEs per LSP and/or node. Fault and performance monitoring may also include intermediate optical performance monitoring at selected nodes along a path.

The WSON regenerators, OEO switches, and/or WCs may be used in different networking scenarios, which may include fixed regeneration points, shared regeneration pools, and reconfigurable regenerators. In the case of fixed regeneration points, substantially all signals traversing a link or a node may be regenerated. For example, the fixed regeneration points may comprise OEO switches that provide signal regeneration at their ports. Such regenerator NEs, including any one of regenerators, OEO switches, and WCs, may be subject to input constraints and/or output constraints, such as described above. Such regeneration constraints may be needed to implement path selection and/or RWA implementation.

For instance, the regeneration constraints and/or information may be exchanged in a message, e.g. message 502, between a PCC, PCE, and/or NE using IGP or GMPLS. Additionally, the regeneration constraints may be needed to support impairment aware routing and wavelength assignment (IA-RWA). For example, the path select process may require information regarding which NEs are capable of signal generation to implement the IA-RWA. The regeneration information, such as for WCs, may also be useful in typical RWA to relax the wavelength continuity constraint. The fixed generation points scenario may not require changes to the WSON signaling scheme since reconfigurable regenerator options may not be used for input, output, and processing.

In the case of shared regeneration pools, a plurality of NEs may share a regenerator pool. For example, a plurality of regenerators may be shared within a node in the network and any of the regenerators may be optionally applied to a signal traversing the node. In shared regeneration pools, reconfigurable regenerator options may not be used for input and output but may be needed for processing. In this case, regeneration information may be used for path computation to select a path that ensures compatibility and/or IA-RWA requirements. In an embodiment, to set up a LSP that uses a regenerator in a node associated with a shared regenerator pool, GMPLS signaling may be modified to indicate that regeneration is needed at the node along a signal path.

In the case of reconfigurable regenerators, the NEs may require configuration prior to processing an optical signal. For example, a regenerator may be configured to receive signals with different characteristics, choose an output attribute (e.g. modulation or FEC) from a selection of output attributes, or perform regeneration with additional processing capabilities. As such, information about the regeneration properties of the regenerator may be signaled using GMPLS to select a compatible path using the regenerator and/or for IA-RWA computation. Additionally, during LSP setup, the regeneration properties may be used to configure the regenerator in a node along the path.

Networks that comprise transparent NEs, such as reconfigurable optical add/drop multiplexers (ROADMs) and OEO NEs, such as generators or OEO switches may be referred to sometimes as translucent networks. Translucent networks may implement different GMPLS control plane schemes or approaches. The translucent networks may include (1) transparent "islands" that may be surrounded by regenerators, such as when transitioning from a metro optical sub-network to a long haul optical sub-network. The translucent networks may also include (2) mostly transparent networks with a limited quantity of OEO (or "opaque") nodes that may be strategically placed. Such networks may take advantage of inherent regeneration capabilities of OEO switches, and thus an optimal placement of the OEO switches may be determined. Additionally, the translucent networks may include (3) mostly transparent networks with a limited quantity of optical switching nodes with shared regenerator pools, which may be optionally applied to signals that traverse the switches. The switches may be referred to sometimes as translucent nodes. The translucent network types above may use fixed regeneration points and/or shared regeneration pools scenarios, which may be supported by extending GMPLS signaling.

Some NE models have been provided in WSON framework and draft-bernstein-ccamp-wson-g-info-03.txt (both of which are incorporated herein by reference) to include switching asymmetry and port wavelength constraints. In an embodiment, a plurality of NE compatibility parameters may be used for current node/link models to account for the input constraints, output constraints, and signal processing capabilities described above. The parameters may be used for GMPLS routing purposes and may be exchanged via GMPLS signaling. The input constraints parameters may include (1) permitted optical tributary signal classes, such as a list of optical tributary signal classes that may be processed by the NE or carried over a link. For instance, the corresponding input parameter may specify a configuration type that indicates a permitted optical tributary class.

The input constraints parameters may also include (2) acceptable FEC codes, which may be specified by a configuration type. The input constraints parameters may include (3) an acceptable bit rate set, such as a list of specific bit rates or bit rate ranges that the NE may accommodate. For instance, coarse bit rate information may be included with the optical tributary class restrictions. The input constraints parameters may also include (4) acceptable GPID, such as a list of GPIDs that correspond to client digital streams that may be compatible with the NE. Since the bit rate of the signal may not change over a LSP, the bit rate of the signal may be used as a LSP parameter and this information may be available to any NE associated with the LSP, which may use the information for configuration purposes. In this case, the NE associated bit rate configuration type may not be needed.

The output constraint parameters may include: (1) output modulation, which may indicate one of (a) same as input or (b) list of available types; and (2) FEC options, which also correspond to (a) same as input or (b) list of available codes. The processing capabilities parameters may include: (1) regeneration, which may indicate one of (a) 1R, (b) 2R, (c) 3R, and (d) list of selectable regeneration types; and (2) fault and performance monitoring, which may correspond to (a) GPID particular capabilities or (b) optical performance monitoring capabilities. The parameters above may be specified on a (a) network basis, (b) per port basis, or (c) per regenerator or NE basis. Typically, such information may be provided on a per port basis, for example using a GMPLS interface switching capability descriptor as described in RFC 4202, which is incorporated herein by reference. However, WCs in the WSON framework may be used within a switching system or node on a sub-system basis, and thus it may not be efficient to provide such information only on per port basis.

As described above, the WSON signal may be characterized at any point along a path by a modulation format, FEC, wavelength, bit rate, and/or GPID. The GPID, wavelength (or label), and bit rate may be supported in RFC 3471 and RFC 3473 (both of which are incorporated herein by reference), where change in wavelength at the node along a LSP may be accommodated and explicit control to WCs may be provided. In the fixed regeneration points scenario, current GMPLS signaling may be used to provide the WSON signal attributes or characteristics. In the case of shared regeneration pools, the GMPLS may be extended to instruct to a node to perform regeneration on a particular signal or to specify that some nodes along a LSP may perform regeneration. In the case of reconfigurable regenerators, the GMPLS may also be extended to implement regeneration per node or per LSP basis. The WSON signal characteristics may be indicated using a plurality of attributes or parameters, such as LSP attributes in Record Route Objects (RROs) and/or EROs. For example, the techniques specified in RFC 5420, which is incorporated herein by reference, that allow recording LSP attributes in RROs may be extended to allow additional LSP attributes in EROs. As such, the LSP attributes may be used to indicate where optional 3R regeneration may be performed on a path, any modifications to the WSON characteristics such as the modulation format, and/or any processing capability such as performance monitoring.

In one scenario where the PCE and PCC may be in communications, such as during the method 500, the PCC may indicate any of the following information to the PCE: the GPID type of a LSP, the acceptable signal attributes at the transmitter (at the source), and/or the acceptable signal attributes at the receiver (at the sink). The signal attributes at the source and similarly at the sink may include the modulation type and/or the FEC type. The PCC may also indicate the ability to specify if generation is allowed in the computed path. If this ability is allowed, the PCC may also indicate a maximum number of regenerators or regenerator NEs allowed in the computed path. Subsequently, the PCE may respond to the PCC with the information about the conformity of the requested optical characteristics for the resulting LSP with the source, the sink, and any NE along the LSP. The PCE may also respond with additional LSP attributes, which may be modified along the path, such as modulation format changes.

In one scenario where the PCE and PCC may be in communications, such as during the method 500, the PCC may indicate any of the following information to the PCE: the GPID type of an LSP, the signal attributes at the transmitter (at the source), and/or the signal attributes at the receiver (at the sink). The signal attributes at the source and similarly at the sink may include the modulation type and/or the FEC type. Subsequently, the PCE may respond to the PCC with the information about the conformity of the requested optical characteristics associated with the resulting LSP with the source, the sink, and any NE along the LSP. The PCE may also respond with additional LSP attributes, which may be modified along the path, such as modulation format changes, and/or special or specific node processing information associated with the resulting LSP (e.g. a regeneration point).

RFC 4655, which is incorporated herein by reference, defines a PCE based architecture and explains how a PCE may compute a LSP in Multiprotocol Label Switching Traffic Engineering (MPLS-TE) and GMPLS networks at the request of a PCC. The PCC may be any network component that makes such a request, for instance an Optical Switching Element within a WDM network. The PCE may be located anywhere within the network, for example within a NE, a Network Management System (NMS), an Operational Support System (OSS), or may be an independent network server. The PCEP is the communication protocol used between PCC and PCE and, in some embodiments, may also be used between cooperating PCEs. RFC 4657, which is incorporated herein by reference, specifies some common protocol requirements for PCEP.

In an embodiment, the PCEP may be extended to support compatibility constraints, such as based on the signal attributes, the NE compatibility constraints, the NE functional constraints, and/or the NE compatibility parameters described above. As such, path computations in WSONs may support NE processing using specific signal characteristics and attributes. Some signals used in a WSON may not be compatible with some NEs, including regenerators, OEO switches, and/or WCs. Therefore, the PCE may need the compatibility constraints above to compute a constrained path that satisfies signal compatibility and processing constraints. In an embodiment, the compatibility constraints used by the PCE may comprise input compatibility, such as the type of signals the NE can receive (e.g. modulation type, bit rate, and/or FEC type). The compatibility constraints may comprise regeneration capability, such as the types of processing/regeneration the NE can perform (e.g. for 1R, 2R, or 3R), and the types of conversions the NE can perform (e.g. modulation types and/or FEC types). The compatibility constraints may comprise output format, such as the type of signals the NE can transmit (e.g. modulation types, bit rates, and/or FEC types).

In an embodiment, the PCC may send to the PCE a request parameter (RP) object that indicates the compatibility constraints, e.g. in a request message (message 502). The RP object may comprise a signal compatibility check (SC) bit that may be set (e.g. to about one) to request from the PCE to support signal compatibility and processing constraints. The RP object may comprise a plurality of TLVs or sub-TLVs, such as a modulation type list TLV, a FEC type list TLV, and/or GPID type TLV. The PCE may also send a reply message to the PCC to specify compatibility information associated with the computed path. The compatibility information may be sent in an object in the reply message, which may comprise a plurality of TLVs, such as a modulation type TLV, a FEC type TLV, and/or a regeneration point TLV.

As described above, a set of RBs in a WSON may have a plurality of signal capability constraints. The set of RBs may include regenerators, WCs, and/or OEOs and may form or correspond to one or more NEs in the WSON. The properties of a single RB, e.g. for a single NE, may include: (a) input constraints (e.g. modulation, FEC, bit rate, GPID), (b) processing capabilities (e.g. regeneration, performance monitoring, vendor specific), and (c) output constraints (e.g. modulation, FEC). Such properties for single RBs may be encoded using any of the following TLVs.

Figure 6:
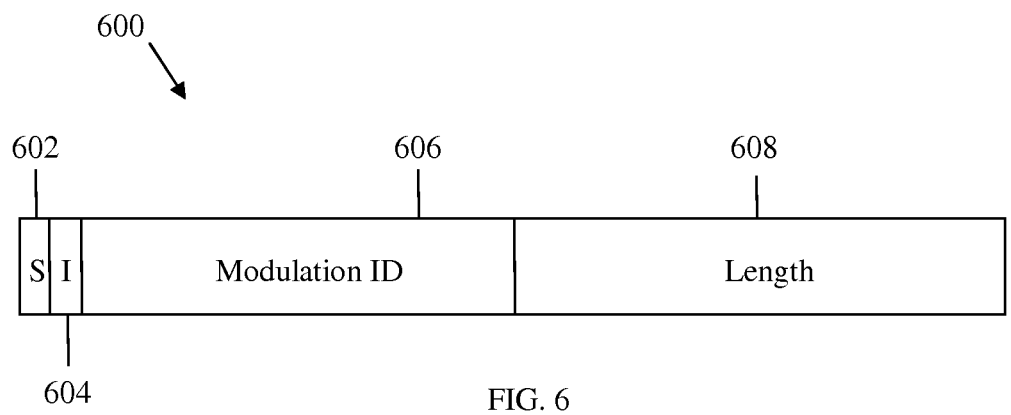
FIG. 6 is a schematic diagram of an embodiment of a modulation format header.

FIG. 6 illustrates one embodiment of a modulation type or format header 600 for a modulation type or format TLV that may be forwarded from the PCC to the PCE or between NEs. The modulation format header 600 may comprise a standardized modulation (S) bit 602, an input modulation format (I) bit 604, a modulation ID 606, and a length field 608. In an embodiment, the modulation format header 600 may have a size of about 32 bits. The S bit 602 may be set, e.g. to about one, to indicate a standardized modulation format or may be set, e.g. comprise about zero, to indicate a vendor specific modulation format. The I bit 604 may be set, e.g. to about one, to indicate an input modulation format and/or a sink modulation type or may not be set, e.g. to about zero, to indicate an output modulation format and/or a source modulation type. The modulation ID 606 may comprise a unique ID associated with one modulation format/type. The length field 608 may indicate the entire size of the modulation format field.

One or more modulation format fields may be forwarded in a modulation type or format list TLV. The modulation format list TLV may be an input modulation format list TLV that comprises a list of acceptable input formats. As such, the type of the modulation format list TLV may indicate an input modulation format list and the value of the modulation format list TLV may indicate a list of modulation format fields. Alternatively, the modulation format list TLV may be an output modulation format list TLV that comprises a list of acceptable output modulation formats. As such, the type of the modulation format list TLV may indicate an output modulation format list and the value of the modulation format list TLV may indicate a list of modulation format fields. If an output modulation is not specified, then the output modulation may be the same as the input modulation indicated in the modulation type list TLV, and thus no modulation conversion may be implemented in the associated NE.

Figure 7:
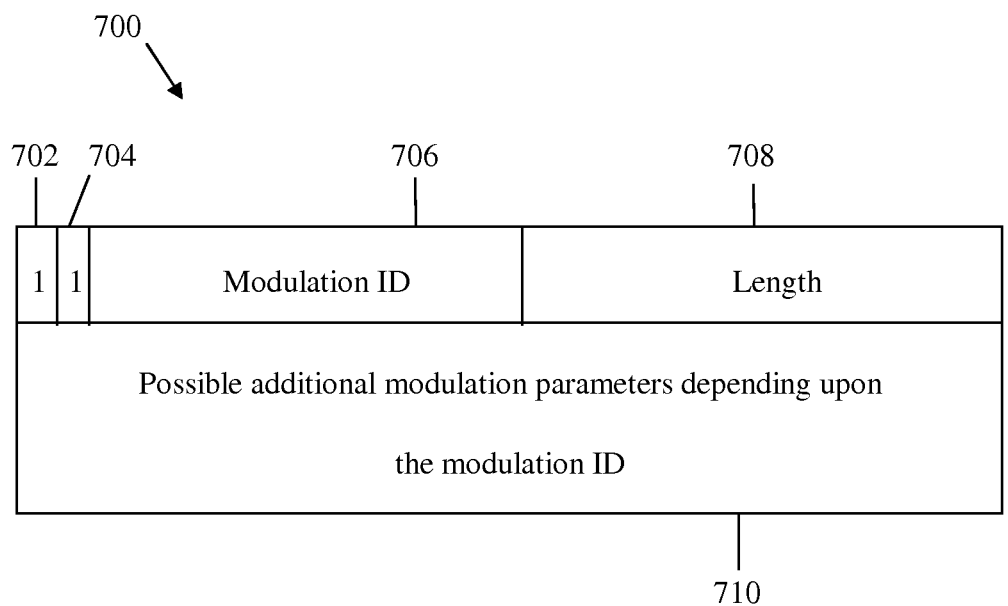
FIG. 7 is a schematic diagram of an embodiment of a modulation type list TLV.

FIG. 7 illustrates one embodiment of a modulation format list TLV 700, which may include the modulation format header 600. The modulation format list TLV 700 may be sent in a RP object, for instance if the SC bit in the RP object is set. The modulation format list TLV 700 may comprise an S bit 702, an I bit 704, a modulation ID 706, and a length field 708, which may be similar to the corresponding fields in modulation format header 600. The modulation format list TLV 700 may also comprise at least one field 710 that includes additional modulation parameters based on the modulation ID 706. Specifically, the modulation format list TLV 700 may correspond to a standardized modulation format. As such, the S bit 702 may be set, e.g. to about one. The modulation ID 706 may comprise a value of about one to indicate an optical tributary signal class NRZ 1.25 G, a value of about two to indicate an optical tributary signal class NRZ 2.5 G, a value of about three to indicate an optical tributary signal class NRZ 10 G, a value of about four to indicate an optical tributary signal class NRZ 40 G, or a value of about five to indicate an optical tributary signal class RZ 40 G. Alternatively, the modulation ID 706 may comprise a reserved value of about zero. Other modulation types may have other assigned values and/or may be characterized using additional parameters. The field 710 may indicate allowable modulation types in the source (transmitter) and/or the sink (receiver).

Figure 8:
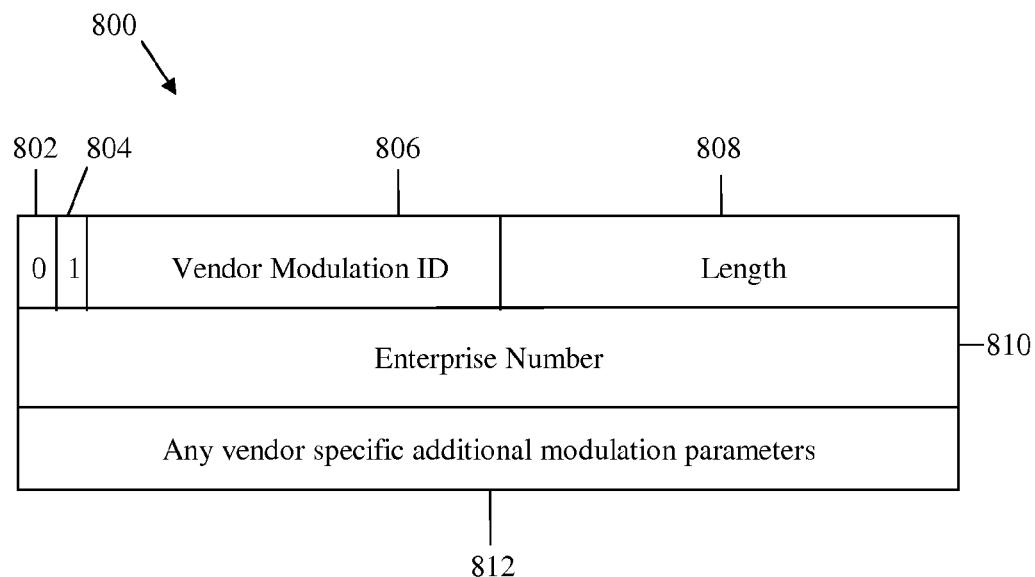
FIG. 8 is a schematic diagram of another embodiment of a modulation type list TLV.

FIG. 8 illustrates another embodiment of a modulation format list TLV 800, which may include the modulation format header 600. The modulation format list TLV 800 may be sent in a RP object, for instance if the SC bit in the RP object is set. The modulation format list TLV 800 may comprise an S bit 802, an I bit 804, and a length field 808, which may be similar to the corresponding fields in modulation format header 600. The modulation format list TLV 800 may also comprise a vendor modulation ID 806, an enterprise number 810, and at least one field 812 that includes vendor specific additional modulation parameters. Specifically, the modulation format list TLV 800 may correspond to vendor specific modulation format. As such, the S bit 802 may be set, e.g. to about zero. The vendor modulation ID 806 may comprise an assigned ID for the modulation type, e.g. for a vendor. The enterprise number 810 may comprise a unique identifier of an organization and may comprise about 32 bits. The enterprise numbers may be assigned by the Internet Assigned Numbers Authority (IANA) and managed through IANA registry, e.g. according to RFC 2578. The field 812 may comprise additional parameters that characterize vendor specific modulation.

Figure 9:
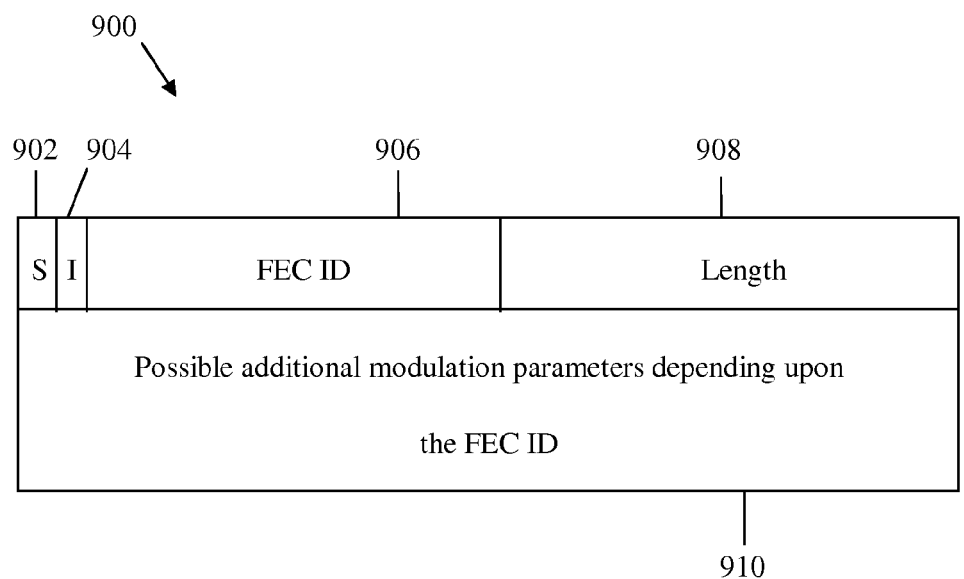
FIG. 9 is a schematic diagram of an embodiment of a FEC type list TLV.

FIG. 9 illustrates one embodiment of a FEC type list TLV 900 that may be forwarded from the PCC to the PCE or between NEs. The FEC type list TLV 900 may be sent in a RP object, for instance if the SC bit in the RP object is set. The FEC type list TLV 900 may be an input FEC type list TLV that comprises a list of acceptable FEC types. As such, the type of the FEC type list TLV 900 may indicate an input FEC type field list and the value of the FEC type list TLV 900 may indicate a list of FEC type fields. Alternatively, the FEC type list TLV 900 may be an output FEC type list TLV that comprises a list of output FEC types. As such, the type of the FEC type list TLV 900 may indicate an output FEC type field list and the value of the FEC type list TLV 900 may indicate a list of FEC type fields.

The FEC type list TLV 900 may comprise an S bit 902, an I bit 904, a FEC ID 906, a length field 908, and at least one field 910 that includes FEC parameters based on the FEC ID 906. The S bit 902 may be set, e.g. to about one, to indicate a standardized FEC format or may be set, e.g. comprise about zero, to indicate a vendor specific FEC format. The I bit 904 may be set, e.g. to about one, to indicate an input FEC format and/or a sink FEC type or may not be set, e.g. to about zero, to indicate an output FEC format and/or a source FEC type. The FEC ID 906 may comprise a unique ID associated with one FEC format/type. The length field 908 may indicate the entire size of the FEC type field 900.

Figure 10:
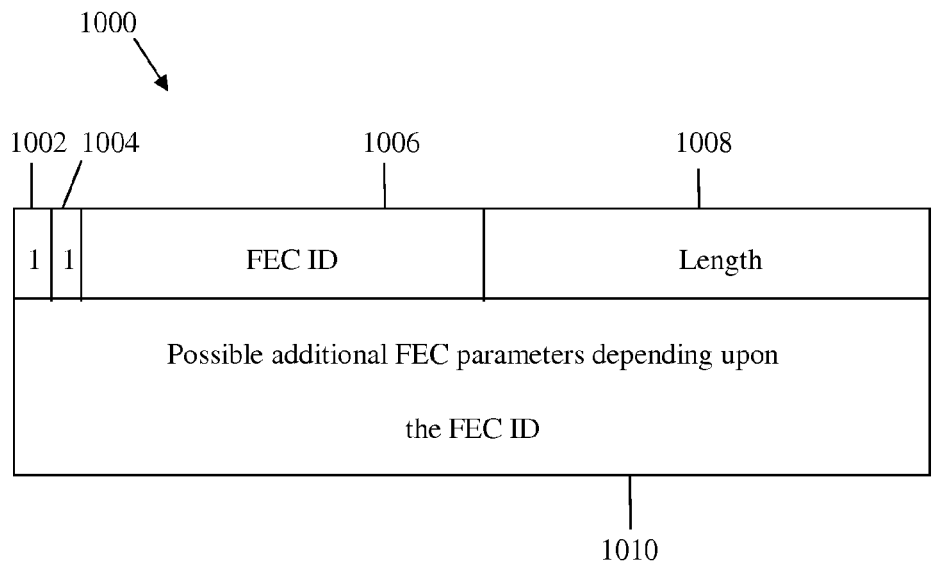
FIG. 10 is a schematic diagram of another embodiment of a FEC type list TLV.

FIG. 10 illustrates another embodiment of a FEC type list TLV 1000 that may be forwarded from the PCC to the PCE or between NEs. The FEC type list TLV 1000 may comprise an S bit 1002, an I bit 1004, and a length field 1008, which may be similar to the corresponding components of the FEC type list TLV 900. The FEC type list TLV 1000 may also comprise a FEC ID 1006 and at least one field 1010. Specifically, the FEC type list TLV 1000 may correspond to a standardized FEC format. As such, the S bit 1002 may be set, e.g. to about one. The FEC ID 1006 may comprise a value of about one to indicate an ITU-T G.709 Reed-Solomon FEC or a value of about two to indicate an ITU-T G.907V compliant Ultra FEC. The FEC 1006 may comprise a value of about three to indicate an ITU-T G.975.1 Concatenated FEC (RS(255,239)/CSOC(n0/k0=7/6,j=8)), a value of about four to indicate a G.975.1 Concatenated FEC (Bose-Chaudhuri-Hocquengham or BCH(3860,3824)/BCH(2040,1930)), a value of about five to indicate a G.975.1 Concatenated FEC (RS(1023,1007)/BCH(2407,1952)), or a value of about six to indicate a G.975.1 Concatenated FEC (RS(1901,1855)/Extended Hamming Product Code (512,502)X(510,500)). The FEC 1006 may comprise a value of about seven to indicate a G.975.1 low density parity check (LDPC) Code, a value of about eight to indicate a G.975.1 Concatenated FEC (Two orthogonally concatenated BCH codes), a value of about nine to indicate a G.975.1 RS(2720,2550), or a value of about 10 to indicate a G.975.1 Concatenated FEC (Two interleaved extended BCH (1020,988) codes). The standards G.709V and G.975.1 are both incorporated herein by reference. Alternatively, the FEC ID 1006 may comprise a reserved value of about zero. The field 1010 may indicate allowable and/or additional FEC types in the source (transmitter) and/or the sink (receiver).

Figure 11:
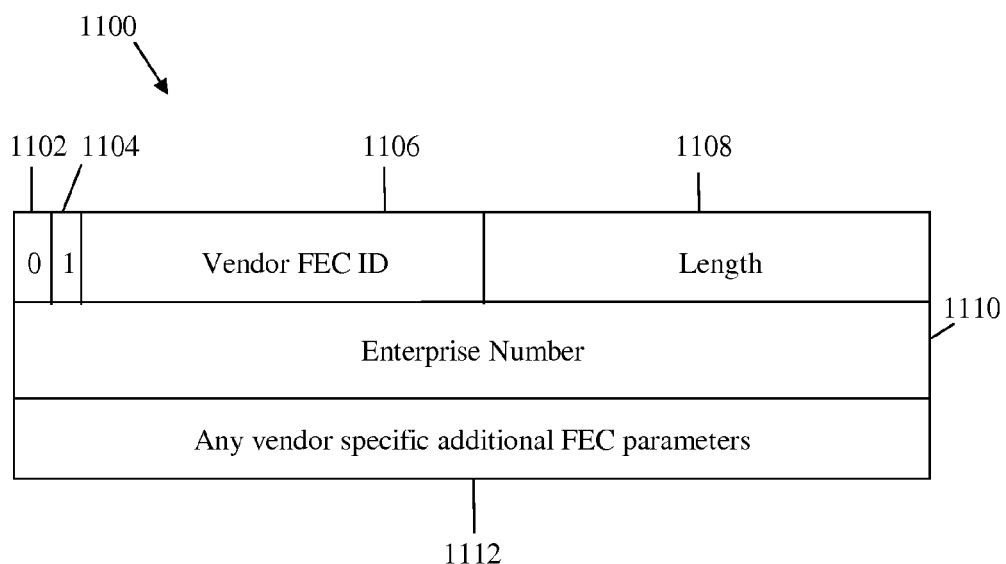
FIG. 11 is a schematic diagram of another embodiment of a FEC type list TLV.

FIG. 11 illustrates another embodiment of a FEC type list TLV 1100 that may be forwarded from the PCC to the PCE or between NEs. The FEC type list TLV 1100 may comprise an S bit 1102, an I bit 1104, and a length field 1108, which may be similar to the corresponding components of the FEC type list TLV 900. The FEC type list TLV 1100 may also comprise a vendor FEC ID 1106, an enterprise number 1110, and at least one field 1112 that includes vendor specific additional FEC parameters. Specifically, the FEC type list TLV 1100 may correspond to vendor specific FEC format. As such, the S bit 1102 may be set, e.g. to about zero. The vendor FEC ID 1106 may comprise a vendor assigned ID for the FEC type. The enterprise number 1110 may comprise a unique identifier of an organization and may comprise about 32 bits. The enterprise numbers may be assigned by IANA and managed through IANA registry, e.g. according to RFC 2578. The field 1112 may comprise additional parameters that characterize vendor specific FEC.

FIG. 12 illustrates one embodiment of a GPID type TLV 1200 that may be forwarded from the PCC to the PCE or between NEs. The GPID type TLV 1200 may be sent in a RP object, for instance if the SC bit in the RP object is set. The GPID type TLV 1200 may comprise a GPID that may be assigned by IANA, such as one of the GPIDs specified in RFC 3471 and RFC 4328.

FIG. 13 illustrates one embodiment of a modulation type TLV 1300 that may be forwarded from the PCE to the PCC or between NEs. The modulation type TLV 1300 may be sent in reply to a RP object from the PCC, for instance if the SC bit in the RP object is set. The modulation type TLV 1300 may comprise a modulation ID 1302 and a length field 1304. The modulation ID 1302 may comprise a unique ID associated with the computed path from the PCE, which may be the same ID sent in the modulation ID 706 or the vendor modulation ID 806. The length field 1302 may indicate the length of the modulation type TLV 1300, which may be equal to about 32 bits.

FIG. 14 illustrates one embodiment of a FEC type TLV 1400 that may be forwarded from the PCE to the PCC or between NEs. The FEC type TLV 1400 may be sent in reply to a RP object from the PCC, for instance if the SC bit in the RP object is set. The FEC type TLV 1400 may comprise a FEC ID 1402 and a length field 1404. The FEC ID 1402 may comprise a unique ID associated with the computed path from the PCE, which may be the same ID sent in the FEC ID 1006 or the vendor FEC ID 1106. The length field 1402 may indicate the length of the FEC type TLV 1400, which may be equal to about 32 bits.

FIG. 15 illustrates one embodiment of a regeneration point TLV 1500 that may be forwarded from the PCE to the PCC or between NEs. The regeneration point TLV may also be referred to as a capability parameter TLV. The regeneration point TLV 1500 may be sent in reply to a RP object from the PCC, for instance if the SC bit in the RP object is set. The regeneration point TLV 1500 may comprise a generator type (T) field 1502, a generator capability (C) field 1504, and a reserved field 1506. The T field 1502 may indicate a regenerator type. The T field 1502 may comprise a value of about one to indicate a 1R regenerator, a value of about two to indicate a 2R regenerator, and a value of about three to indicate a 3R regenerator. Alternatively, the T field 1502 may comprise a reserved value of about zero. The C field 1504 may indicate a generator capability. The C field 1504 may comprise a value of about one to indicate a fixed regeneration point and a value of about two to indicate a selective regeneration pools. When selective generation pools are indicated, regeneration pool properties, such as input and output constraints and availability, may be specified, e.g. in another TLV from the PCE. Alternatively, the C field 1504 may comprise a reserved value of about zero. The reserved field 1506 may be reserved and may not be used.

Figure 16:
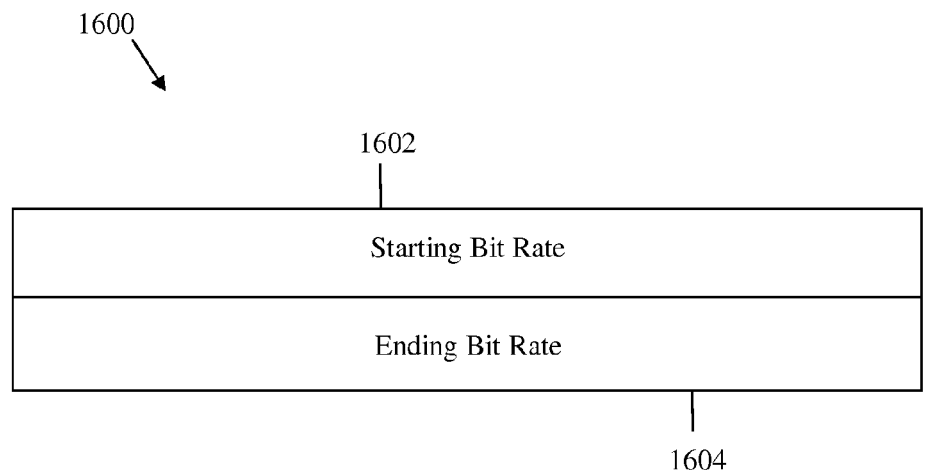
FIG. 16 is a schematic diagram of an embodiment of a bit rate range field.

FIG. 16 illustrates one embodiment of a bit rate range field 1600 that may be forwarded from the PCC to the PCE or between NEs. One or more bit rate range fields 1600 may be forwarded in a bit rate range list TLV. The bit rate range field 1600 may be sent in a RP object, for instance if the SC bit in the RP object is set. The bit rate range field 1600 may comprise a starting bit rate 1602 and an ending bit rate 1604. The starting bit rate 1602 may indicate the starting bit rate in the bit rate range and the ending bit rate 1604 may indicate the ending bit rate in the bit rate range. Thus, the starting bit rate 1602 value may be less than the ending bit rate 1604 value. The starting bit rate 1602 and the ending bit 1604 may each comprise about 32 bits of Institute of Electrical and Electronics Engineers (IEEE) floating point numbers.

Figure 17:
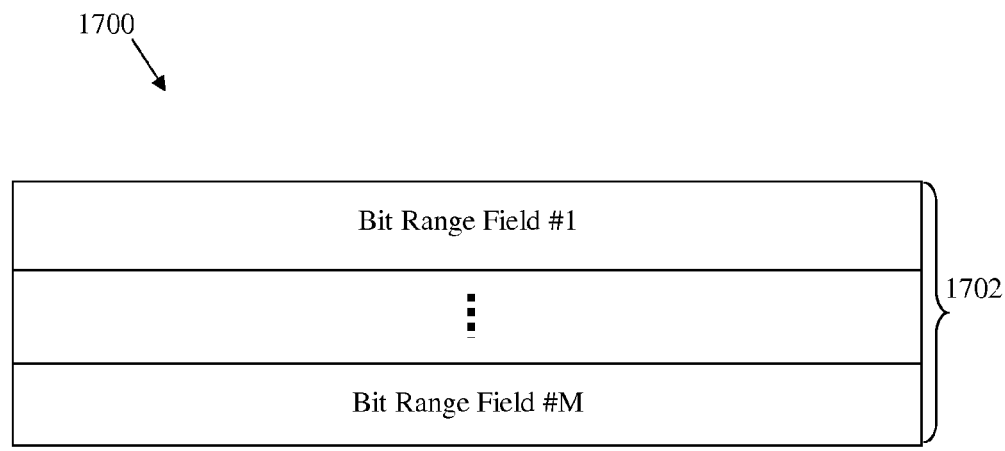
FIG. 17 is a schematic diagram of an embodiment of a bit rate range list TLV.

FIG. 17 illustrates one embodiment of a bit rate range list TLV 1700, which may comprise one or more bit rate range fields 1702, such as the bit rate range fields 1600. The bit rate range list TLV 1700 may be an input bit rate range list TLV that comprises a list of acceptable input bit rate ranges. As such, the type of the bit rate range list TLV may indicate an input bit rate range list and the value of the bit rate range list TLV may indicate a list of bit rate range fields.

Figure 18:
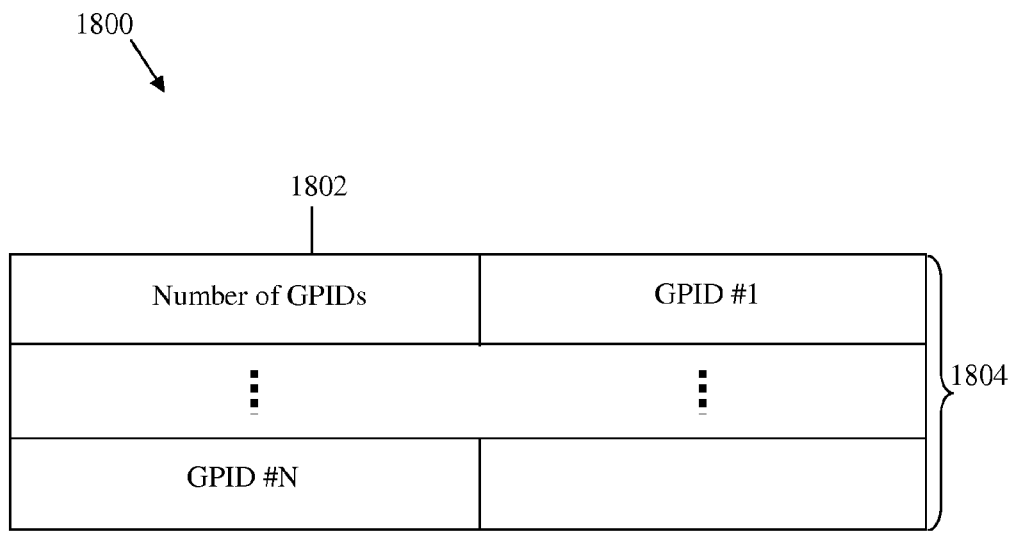
FIG. 18 is a schematic diagram of an embodiment of a client signal list TLV.

FIG. 18 illustrates one embodiment of a client signal list TLV 1800 that may be forwarded from the PCC to the PCE or between NEs. The client signal list TLV 1800 may be an input client signal list TLV that comprises a list of acceptable input client signal types. As such, the type of the client signal list TLV may indicate an input client signal list and the value of the client signal list TLV may indicate a list of GPIDs. The client signal list TLV 1800 may be sent in a RP object, for instance if the SC bit in the RP object is set. The client signal list TLV 1800 may comprise a number of GPIDs field 1802 and a GPID list 1804. The GPID list 1804 may comprise one or more GPID fields or GPID type TLVs 1200, e.g. GPID #1, ..., GPID #N (N is an integer).

Figure 19:
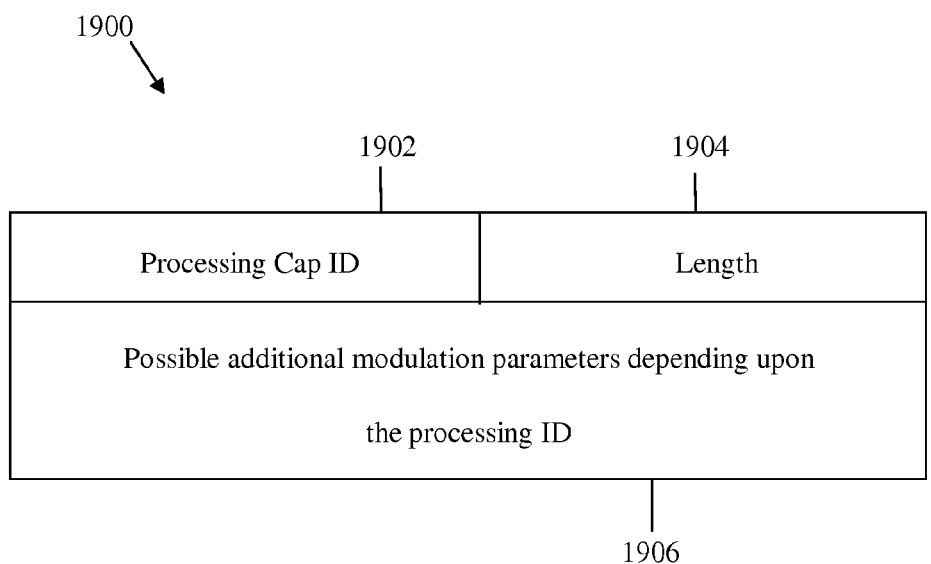
FIG. 19 is a schematic diagram of an embodiment of a processing capability list TLV.

FIG. 19 illustrates one embodiment of a processing capability list TLV 1900 that may be forwarded from the PCC to the PCE or between NEs. The processing capability list TLV 1900 may be sent in a RP object, for instance if the SC bit in the RP object is set. The processing capability list TLV 1900 may be an input processing capability list TLV that comprises a list of resource blocks processing capabilities. The resource block may correspond to an OEO, regenerator, or WC in a NE or a pool of shared NEs. The type of the processing capability list TLV 1900 may indicate a processing capability list and the value of the processing capability list TLV 1900 may indicate a list of processing capability fields. The processing capability list TLV 1900 may be a list of WSON NEs that can perform signal processing functions, including regeneration capability, fault and performance monitoring, and vendor specific capability. Each of these capabilities may be indicated using assigned coding.

The processing capability list TLV 1900 may comprise a processing capability ID 1902, a length field 1904, and at least one field 1906 that includes additional processing capability parameters based on the processing capability ID 1902. The processing capability ID 1902 may comprise a unique ID that indicates a regeneration capability. The length field 1902 may indicate the processing capability field 1900. The field 1906 may comprise additional capability parameters, such as one or more capability parameter TLVs or regeneration point TLVs 1500. If the capability of a regenerator is indicated as selective generation pool, the regeneration pool properties, such as ingress or egress restrictions and availability may also be needed. Such information may be encoded and sent with the processing capability list TLV 1900, for example in a different field or TLV.

Further, the properties of a set of RBs, e.g. for a resource pool for multiple NEs, may be encoded using a RB set field or TLV. The set of RBs may be sent in a RB descriptor TLV, a RB accessibility TLV, a resource range restriction TLV, or a resource usage state TLV, as described below. The different TLVs may be associated with different types of resource pools and may comprise a RB set fields or TLVs, which may describe the corresponding resource pool properties. The RB set field or TLV may be configured similar to a lambda label, as described in RFC 3471.

Figure 20:
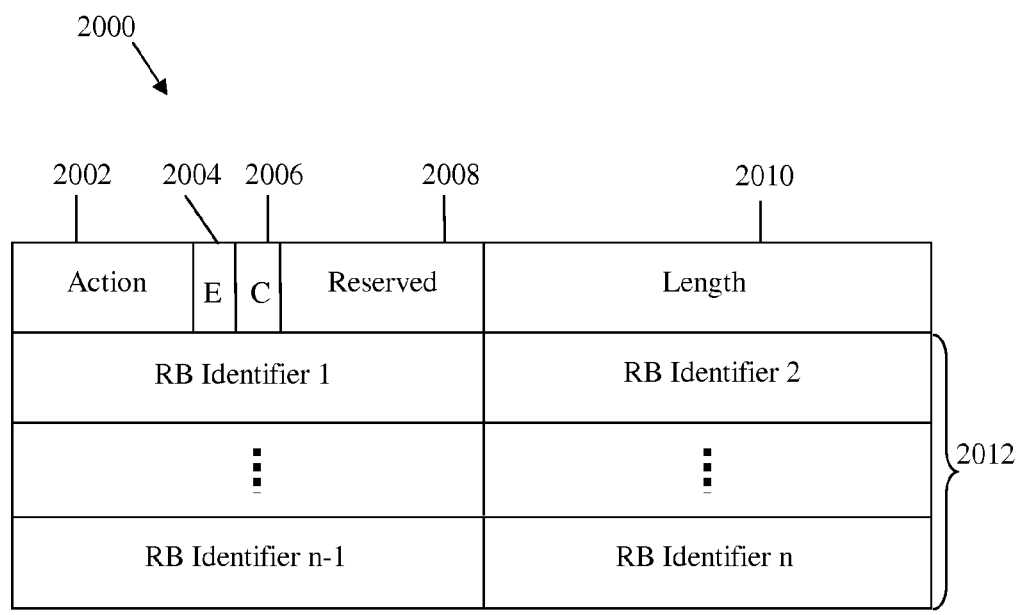
FIG. 20 is a schematic diagram of an embodiment of a RB set TLV.

FIG. 20 illustrates one embodiment of a RB set TLV 2000 that may be forwarded from the PCC to the PCE or between NEs. The RB set TLV 2000 may be sent in a RP object, for instance if the SC bit in the RP object is set. The RB set TLV 2000 may comprise an action field 2002, an event (E) bit 2004, a connectivity (C) bit 2006, a reserved field 2008, a length field 2010, and one or more RB identifiers (or IDs) 2012. The action field 2002 may comprise a value of about zero to indicate an inclusive list, where one or more RB elements may be included in the RB set TLV 2000. Alternatively, the action field 2002 may comprise a value of about two to indicate an inclusive range, where the RB set field 2000 may indicate a range of resources. Accordingly, the RB set TLV 2000 may comprise two WC elements. The first WC element may indicate the start of the range and the second WC element may indicate the end of the range. The second WC element may be set to about zero if there is no bound on the corresponding range.

The E bit 2004 may be set, e.g. to about one, to indicate an even number of RB identifiers 2012 or may be set, e.g. to about zero, to indicate an odd number of RB identifiers. The C bit 2006 may be set to about zero to indicate a fixed connectivity, for example for multicast case, or may be set to about one to indicate a switched connectivity. The C bit 2006 may be used in a RB accessibility TLV and may be ignored in other TLVs. The reserved field 2008 may be reserved and may not be used, where the bits in the reserved field 2008 may be set to about zeros and may be ignored on reception. The length field 2010 may indicate the length of the RB set TLV 2000, e.g. in bytes. Each RB identifier 2012 may comprise a unique ID associated with one RB element. The action field 2002 may have a length of about eight bits, the reserved field 2008 may have a length of about six bits, and both the length field 2010 and the RB identifier 2012 may have a length of about 16 bits. If there is an odd number of RB identifiers 2012 in the RB set TLV 2000, the remaining about 16 bits in the last 32 bits of the RB set TLV 2000 that follow the last RB identifier 2012 may be padded, e.g. set to about zero bits.

Figure 21:
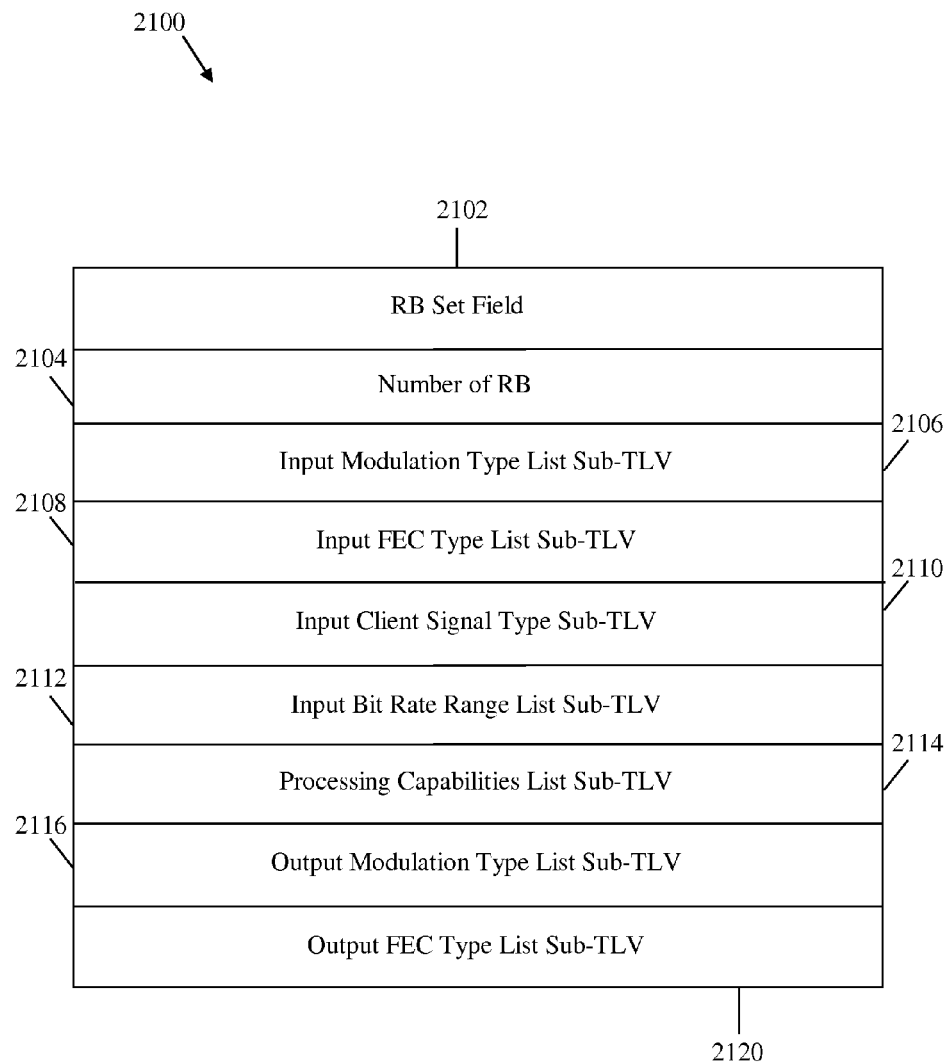
FIG. 21 is a schematic diagram of an embodiment of a RB descriptor TLV.

FIG. 21 illustrates one embodiment of a RB descriptor TLV 2100, which may comprise a RB set field or TLV. The RB descriptor TLV 2100 may be used to send relatively static information about individual RBs, e.g. about resource pool properties, and the number of included RBs. The RB descriptor TLV 2100 may indicate one or more properties for each indicated RB using some of the TLVs described above. The RB descriptor TLV 2100 may comprise a RB set field 2102 that may be substantially similar to the RB set TLV 2000, a number of RBs field 2104 that indicates the number of included RBs, and a TLV, e.g. that corresponds to each RB. The TLVs may include an input modulation type list TLV 2106 that may comprise or correspond to the modulation format list TLV 700 or 800, an input FEC type list TLV 2108 that may comprise or correspond to the FEC type list TLV 900, 1000, or 1100, an input client signal type TLV 2110 that may comprise or correspond to the client signal list TLV 1800, and/or an input bit rate range list TLV 2112 that may comprise or correspond to the bit rate range list TLV 1700. The TLVs in the RB descriptor TLV 2100 may also include a processing capability list TLV 2114 that may comprise or correspond to the processing capability list TLV 1900, an output modulation type list TLV 2116 that may comprise or correspond to the modulation format list TLV 700 or 800, and/or an output FEC type list TLV 2120 that may comprise or correspond to the FEC type list TLV 900, 1000, or 1100.

Figure 22:
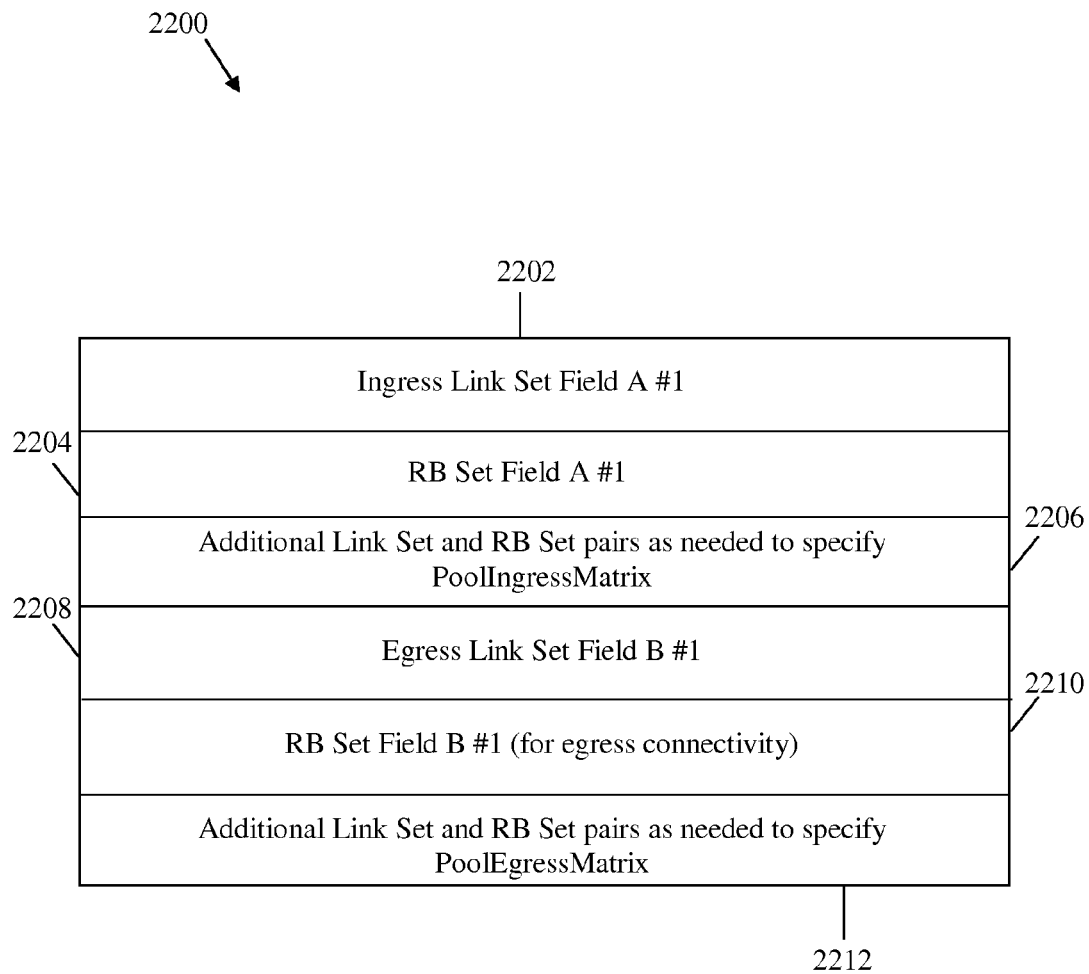
FIG. 22 is a schematic diagram of an embodiment of a RB accessibility TLV.

FIG. 22 illustrates one embodiment of a RB accessibility TLV 2200, which may comprise a RB set field or TLV. The RB accessibility TLV 2200 may be used to describe the structure of a resource pool in relation to a switching device or NE. The RB accessibility TLV 2200 may indicate the ability of an ingress port to reach a RB and of a RB to reach an egress port. This information may correspond to the PoolIngressMatrix and PoolEgressMatrix information in draft-ietf-ccamp-rwa-info.txt. The RB accessibility TLV 2200 may comprise an ingress link set field 2202 (e.g. ingress link set field A #1) and a corresponding RB set field 2204 (e.g. RB set field A #1). The ingress link set field 2202 may indicate the connectivity of a set of ingress ports and may comprise a direction parameter (not shown) that indicates whether the link set is an ingress or egress link set. The direction parameter may not have a bidirectional value. The RB set field 2204 may be substantially similar to the RB set TLV 2000. Similarly, the RB accessibility TLV 2200 may comprise additional ingress link set field and RB set field pairs 2206 as needed to specify a PoolIngressMatrix.

The RB accessibility TLV 2200 may also comprise an egress link set field 2208 (e.g. ingress link set field B #1) and a corresponding RB set field 2210 (e.g. RB set field B #1). The egress link set field 2208 may indicate the connectivity of a set of egress ports and may comprise a direction parameter (not shown) that indicates whether the link set is an ingress or egress link set. The RB set field 2210 may be substantially similar to the RB set TLV 2000. Similarly, the RB accessibility TLV 2200 may comprise additional egress link set field and RB set field pairs 2212 as needed to specify a PoolEgressMatrix.

Figure 23:
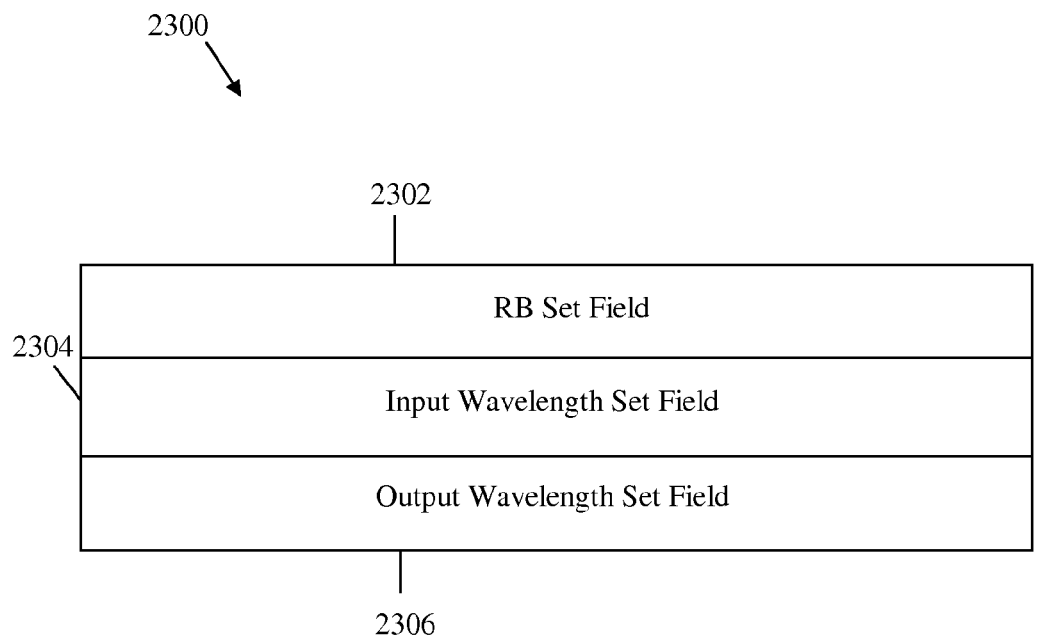
FIG. 23 is a schematic diagram of an embodiment of a resource range restriction TLV.

FIG. 23 illustrates one embodiment of a resource range restriction TLV 2300, which may comprise a RB set field or TLV. The resource range restriction TLV 2300 may be used to indicate the input and/or output wavelength ranges for a set of RBs, such as for a WC. The resource range restriction TLV 2300 may also indicate which of the supported RB wavelengths may be available or reached. The resource range restriction TLV 2300 may comprise a RB set field 2302 that may be substantially similar to the RB set TLV 2000, an input wavelength set field 2304, and an output set field 2306. The RB set field 2302 may indicate a set of RBs that have the same wavelength restrictions. The input wavelength set field 2304 may indicate the wavelength input restrictions of the RBs and the output set field 2306 may indicate the wavelength output restrictions of the RBs.

Figure 24:
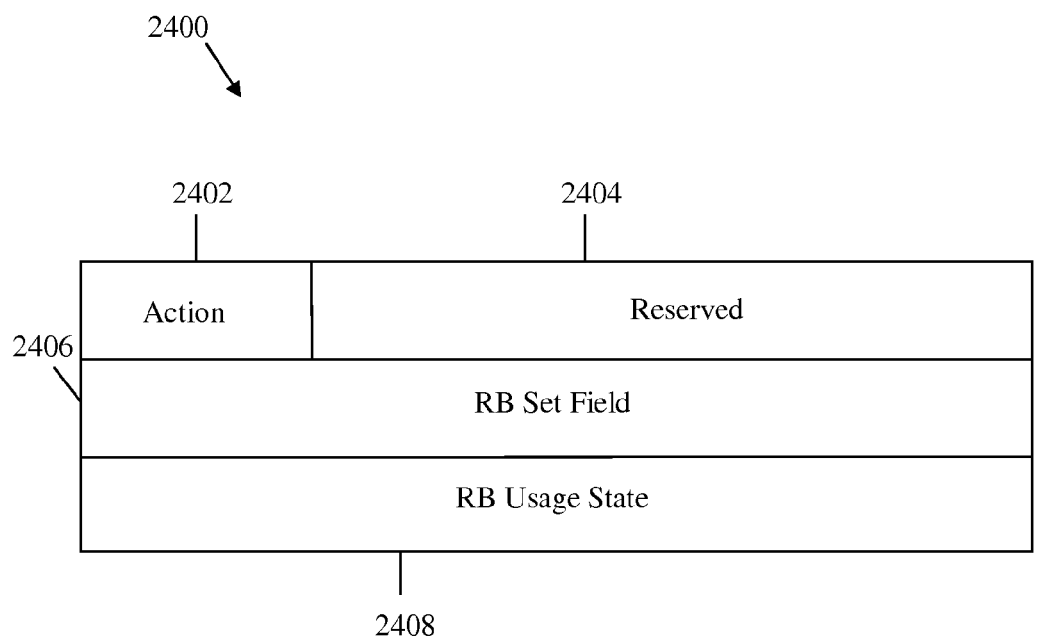
FIG. 24 is a schematic diagram of an embodiment of a resource usage state TLV.

FIG. 24 illustrates one embodiment of a resource usage state TLV 2400, which may comprise a RB set field or TLV. The resource usage state TLV 2400 may comprise either a list of about 16 bit integer values or a bit map that indicates whether each one of a set of resources is available or in use. The information indicated by the resource usage state TLV 2400 may be relatively dynamic, e.g. may change when a connection is established or removed. The resource usage state TLV 2400 may comprise an action field 2402, a reserved field 2404, a RB set field 2406, and a RB usage state field 2408. The action field 2402 may be set to about zero to indicate a list of about 16 bit integer values in the RB usage state field 2408. Alternatively, the action field 2402 may be set to about one to indicate a bit map in the RB usage state field 2408. In both cases, the RB elements in the RB set field 2406 may have a one-to-one correspondence with the values in the RB usage state field 2408. The reserved field 2404 may be reserved and may not be used. The RB usage state field 2408 may be configured according to the action field 2402, as described below.

Figure 25:
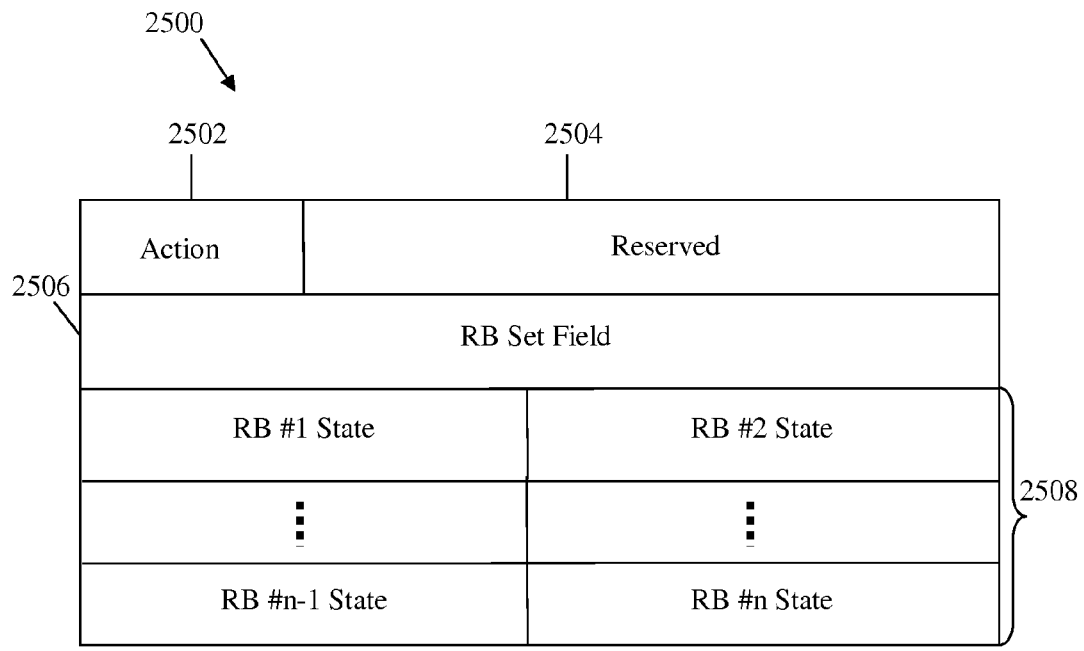
FIG. 25 is a schematic diagram of another embodiment of a resource usage state TLV.

FIG. 25 illustrates another embodiment of a resource usage state TLV 2500, which may be configured similar to the resource usage state TLV 2400. The resource usage state TLV 2500 may comprise an action field 2502, a reserved field 2504, a RB set field 2506, and a set of RB states 2508. Specifically, the action field 2502 may be set to about zero and the set of RB states 2508 may correspond to a plurality of about 16 bits integer values, e.g. in the RB usage state field 2408. Each RB state in the set of RB states 2508 may correspond to one RB element in the RB set field 2506 and indicate the state of the RB, e.g. available or not available. The last RB state may be padded (using zeros), e.g. if the number of RB states is odd.

Figure 26:
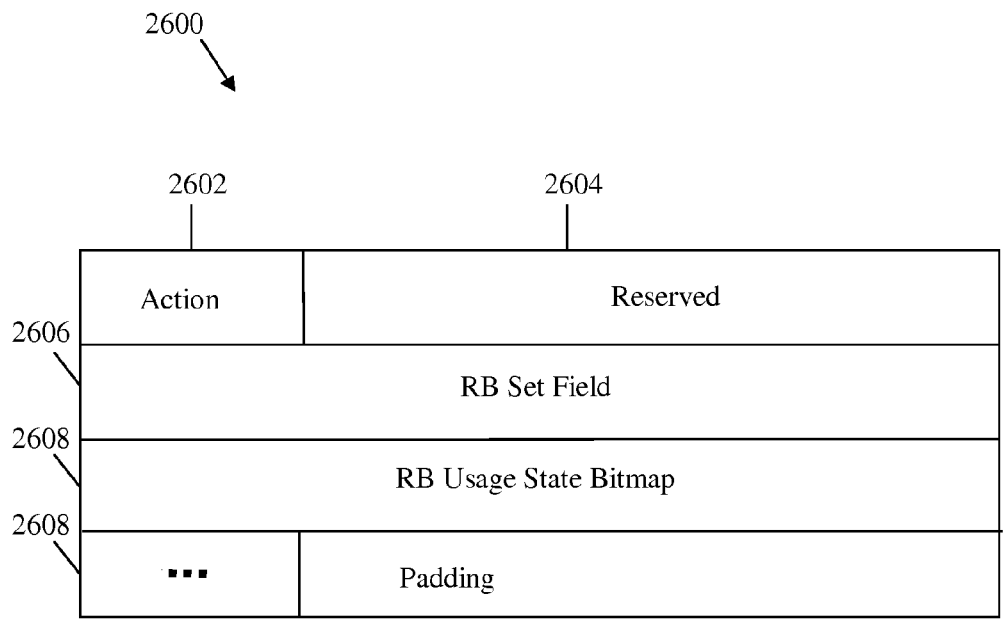
FIG. 26 is a schematic diagram of another embodiment of a resource usage state TLV.

FIG. 26 illustrates another embodiment of a resource usage state TLV 2600, which may be configured similar to the resource usage state TLV 2400. The resource usage state TLV 2600 may comprise an action field 2602, a reserved field 2604, a RB set field 2606, and a RB usage state bitmap 2608. Specifically, the action field 2602 may be set to about one and the bits in the RB usage state bitmap 2608 may correspond to the RB elements in the RB set field 2606 and indicate the state of the corresponding RBs. For example, each bit may be set to about zero if the RB is available or to about one if the RB is in use. The sequence of bits in the RB usage state bitmap 2608 may correspond to the sequence of RBs in the RB set field 2606. The last remaining bits in the RB usage state bitmap 2608 may be padded if necessary, e.g. to fill the last remaining 32 bits in the resource usage state TLV 2600.

In an embodiment, some of the TLVs and fields described above may be used as sub-TLVs in a composite TLV for encoding constraints and processing capabilities for a NE or a resource pool. The composite TLV may be a WSON node TLV that comprises the following information in a list of TLVs:

<Node Info>=<Node_ID>[Other GMPLS sub-TLVs] [<ConnectivityMatrix>...][<ResourcePool>] [<RBPoolState>], where <ResourcePool>=<ResourceBlockDescriptor>* <ResourceBlockAccessibility>*<ResourceRangeRestrictions>*[<RBPoolState>].

Further, if the WSON protocol supports the separation of dynamic information from relatively static information, then a WC pool state may be separated from the WSON node TLV into a WSON dynamic node TLV that comprises the following information:

<NodeInfoDynamic>=<Node_ID>[<RBPoolState>].

Currently, the dynamic information modeled using a node TLV may be associated with the status of the WC pool.

Additionally, some of the link related TLVs and fields described above may be combined in a WSON link TLV that may be a composite TLV, which comprises the following information:

<LinkInfo>=<LinkID>[Other GMPLS sub-TLVs] [<PortWavelengthRestriction> . . . ][<AvailableWavelengths>] [<SharedB ackupWavelengths>].

Further, if the WSON protocol supports the separation of dynamic information from relatively static information, then the available wavelength and shared backup status information may be separated from the WSON link TLV into a WSON dynamic link TLV that comprises the following information:

<DynamicLinkInfo>=<LinkID><AvailableWavelengths> [<SharedBackupWavelengths>].

Figure 27:
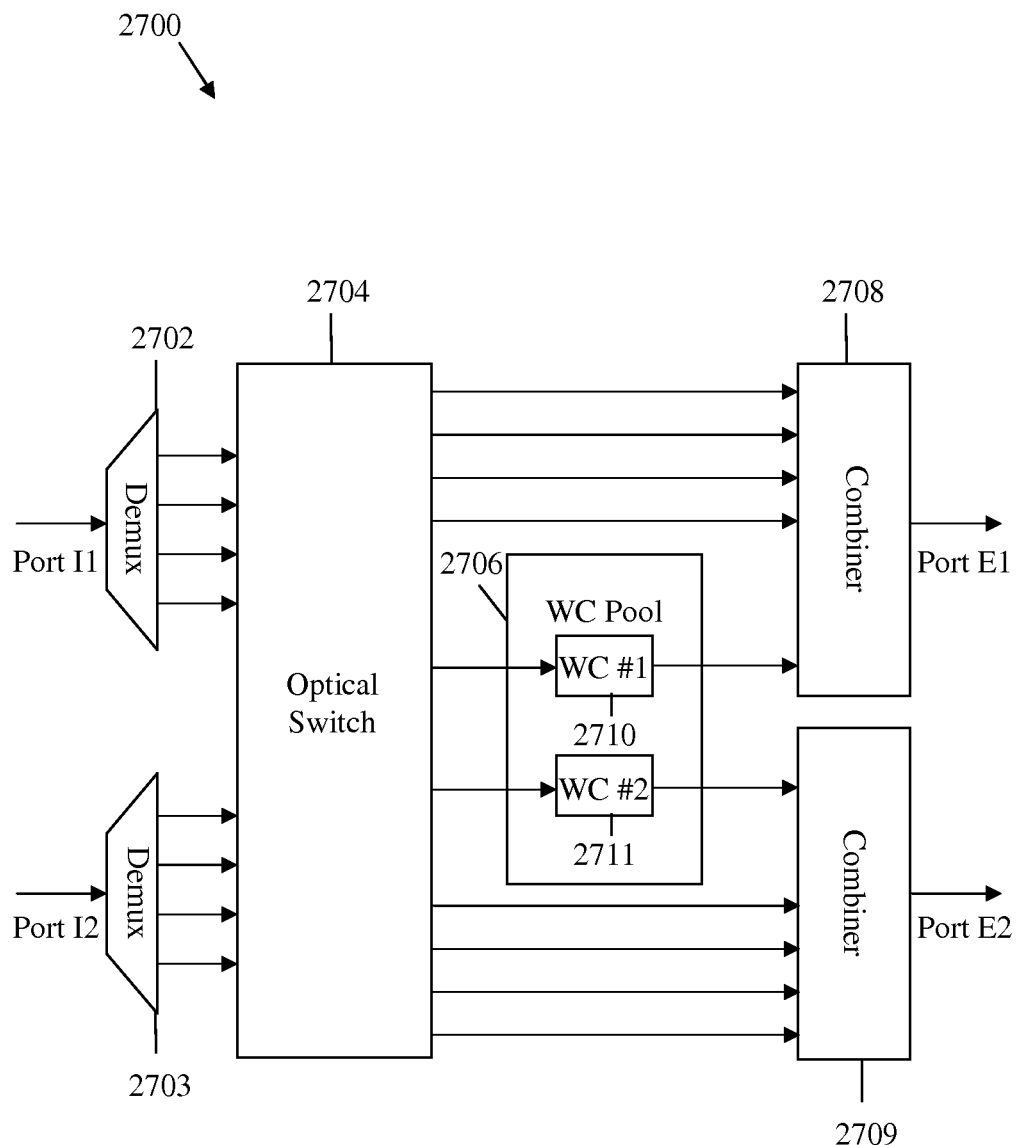
FIG. 27 is a schematic diagram of an embodiment of a wavelength converter pool architecture.

FIG. 27 illustrates an embodiment of a WC pool architecture 2700 that may be used in the WSON, for example for a NE or a plurality of NEs. The WC pool architecture 2700 may comprise a first demultiplexer (Demux) 2702, a second Demux 2703, an optical switch 2704, a WC pool 2706, a first combiner or multiplexer 2708, and a second combiner 2709, which may be arranged as shown in FIG. 27. The WC pool architecture 2700 is an exemplary architecture and other resource pool architectures that comprise similar and/or different components may be used in other embodiments.

The first Demux 2702 may be coupled to a first ingress port (e.g. I1) and the second Demux 2703 may be coupled to a second ingress port (e.g. I2). Each of the two demultiplexers may receive a combined signal on the corresponding ingress port, which may comprise a plurality of wavelength channels. The demultiplexers may separate the wavelength channels, and send each channel on a corresponding link to the optical switch 2704. The optical switch 2704 may correspond to an OXC, PXC, ROADM, WSS, FOADM, or other NE components and may receive the wavelength channels via a plurality of input ports. The optical switch 2704 may switch the wavelength channels, for instance based on the corresponding wavelength and may encapsulate and/or label the data in wavelength channels properly. The optical switch 2704 may then send some of the processed wavelength channels, via corresponding output ports, to the first combiner 2708 and the second combiner 2709 and may send other wavelength channels to the WC pool 2706.

The first combiner 2708 may be coupled to a first egress port (e.g. E1) and the second combiner 2709 may be coupled to a second egress port (e.g. E2). Each of the two combiners may receive the corresponding wavelength channels, combine the wavelength channels, and send the combined wavelength channels on the corresponding egress port. The WC pool 2706 may comprise one or more WCs, for example a first WC 2710 (e.g. WC #1) and a second WC 2711 (e.g. WC #2). Each of the two WCS may receive one or more wavelength channels from the optical switch 2704 and process the wavelength channels based on the constraints and capabilities of the WCs, such as regeneration or wavelength conversion. The first WC 2710 and the second WC 2711 may then forward the corresponding processed wavelength channels to the first combiner 2708 and the second combiner 2709, respectively.

Figure 28:
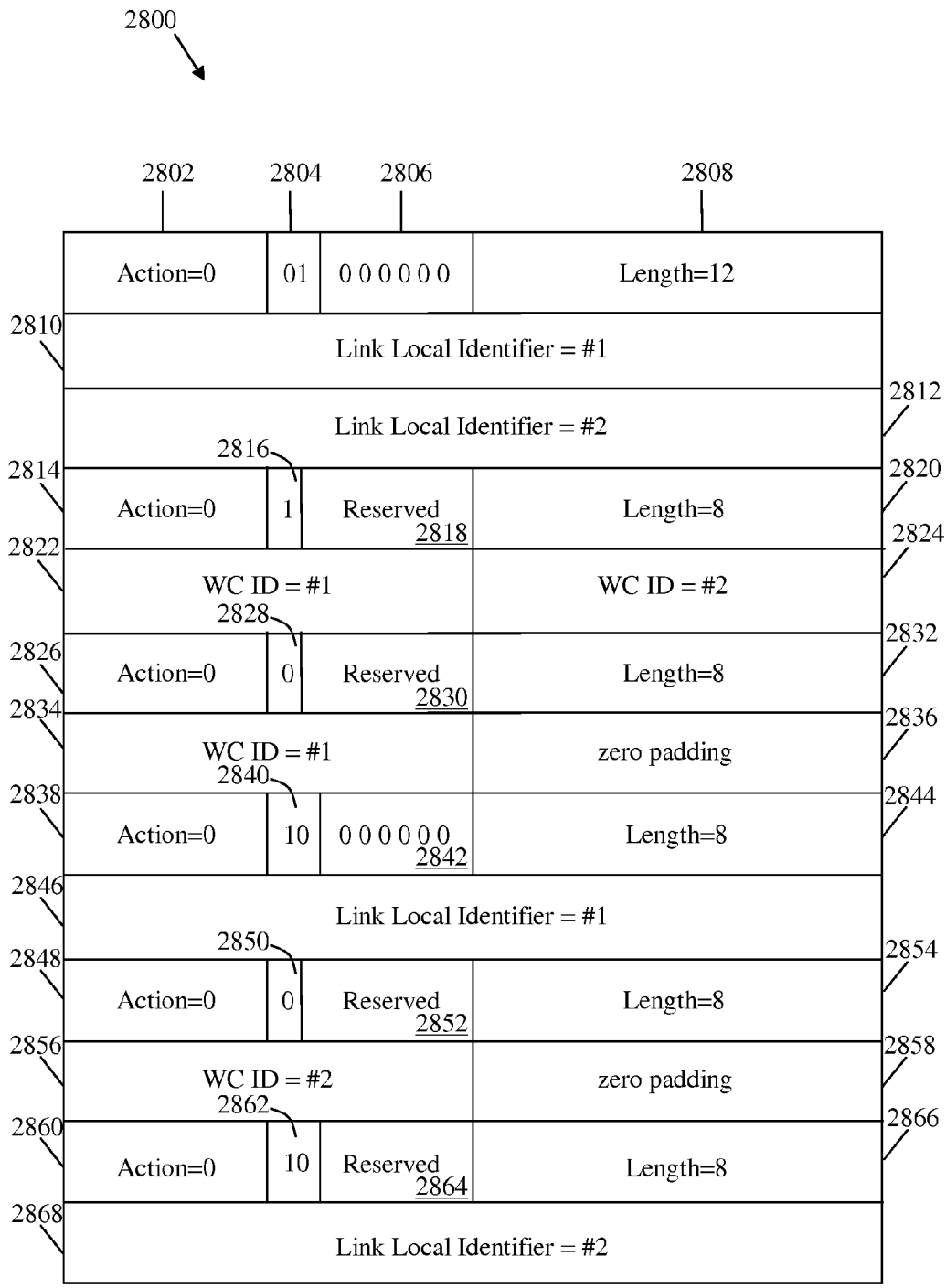
FIG. 28 is a schematic diagram of an embodiment of a wavelength converter accessibility TLV.

The properties, constraints, and capabilities of the WCs may be encoded and signaled in the WSON using a plurality of TLVs, including some the TLVs and fields described above. FIG. 28 illustrates an embodiment of a WC accessibility TLV 2800, which may indicate the accessibility or availability of the components in the WC pool architecture 2700. The WC accessibility TLV 2800 may comprise a first action field 2802, a first bit pair 2804, a first reserved field 2806, a first length field 2808, a first link local identifier 2810, and a second link local identifier 2812. The first link local identifier 2810 and the second link local identifier 2812 may be associated with the first ingress port I1 and the second ingress port I2, respectively, and indicate the ports' connectivity with the WCs in the WC pool architecture 2700.

The fields above may collectively represent a first RB set field or TLV, e.g. similar to the RB set TLV 2000. The first action field 2802 may be set to about zero to indicate an inclusive list of RB elements, e.g. the first link local identifier 2810 and the second link local identifier 2812. The first bit pair 2804 may correspond to the C bit 2006 and the E bit 2004 and may be set to about zero and about one, respectively, to indicate a fixed connectivity and an even number of RB elements. The first link local identifier 2810 may comprise a value associated with I1 (e.g. #1) and the second link local identifier 2812 may comprise a value associated with I2 (e.g. #2).

Additionally, the WC accessibility TLV 2800 may comprise a second action field 2814, a first bit flag 2816, a second reserved field 2818, a second length field 2820, a first WC ID 2822, and a second WC ID 2824. The first WC ID 2822 and the second WC ID 2824 may be associated with the first WC 2710 and the second WC 2712, respectively, and indicate the WCs' connectivity with the ports in the WC pool architecture 2700. The fields above may collectively represent a second RB set field or TLV, e.g. similar to the RB set TLV 2000. The second action field 2814 may be set to about zero to indicate an inclusive list of RB elements, e.g. the first WC ID 2822 and the second WC ID 2824. The first bit flag 2816 may correspond to the E bit 2004 and may be set to about one to indicate an even number of RB elements. The first WC ID 2822 may comprise a value (e.g. #1) associated with the first WC 2710 and the second WC ID 2824 may comprise a value (e.g. #2) associated with the second WC 2712.

The WC accessibility TLV 2800 may also comprise a third action field 2826, a second bit flag 2828, a third reserved field 2830, a third length field 2832, and a third WC ID 2834, which may be associated with the first WC 2710 and indicate the WC's connectivity with the first egress port E1 in the WC pool architecture 2700. The fields above may collectively represent a third RB set field, e.g. similar to the RB set TLV 2000. The third action field 2826 may be set to about zero to indicate an inclusive list of RB elements, e.g. the third WC ID 2834. The second bit flag 2828 may correspond to the E bit 2004 and may be set to about zero to indicate an odd number of RB elements. The third WC ID 2834 may comprise a value (e.g. #1) associated with the first WC 2710. The remaining bits 2836 in the third RB set field may be padded by about zeros.

The WC accessibility TLV 2800 may also comprise a fourth action field 2838, a second bit pair 2840, a fourth reserved field 2842, a fourth length field 2844, and a third link local identifier 2846, which may be associated with the first egress port E1 and indicate the port's connectivity with the first WC 2710 in the WC pool architecture 2700. The fields above may collectively represent a fourth RB set field, e.g. similar to the RB set TLV 2000. The fourth action field 2838 may be set to about zero to indicate an inclusive list of RB elements, e.g. the third link local identifier 2846. The second bit pair 2840 may correspond to the C bit 2006 and the E bit 2004 and may be set to about one and about zero, respectively, to indicate a switched connectivity and an odd number of RB elements. The third link local identifier 2846 may comprise a value associated with E1 (e.g. #1).

The WC accessibility TLV 2800 may also comprise a fifth action field 2848, a third bit flag 2850, a fifth reserved field 2852, a fifth length field 2854, and a fourth WC ID 2856, which may be associated with the second WC 2712 and indicate the WC's connectivity with the second egress port E2 in the WC pool architecture 2700. The fields above may collectively represent a fifth RB set field, e.g. similar to the RB set TLV 2000. The fifth action field 2850 may be set to about zero to indicate an inclusive list of RB elements, e.g. the fourth WC ID 2856. The third bit flag 2850 may correspond to the E bit 2004 and may be set to about zero to indicate an odd number of RB elements. The fourth WC ID 2856 may comprise a value (e.g. #2) associated with the second WC 2712. The remaining bits 2858 in the third RB set field may be padded by about zeros.

The WC accessibility TLV 2800 may also comprise a sixth action field 2860, a third bit pair 2862, a sixth reserved field 2864, a sixth length field 2866, and a fourth link local identifier 2868, which may be associated with the second egress port E2 and indicate the port's connectivity with the second WC 2712 in the WC pool architecture 2700. The fields above may collectively represent a sixth RB set field, e.g. similar to the RB set TLV 2000. The sixth action field 2860 may be set to about zero to indicate an inclusive list of RB elements, e.g. the fourth link local identifier 2868. The third bit pair 2862 may correspond to the C bit 2006 and the E bit 2004 and may be set to about one and about zero, respectively, to indicate a switched connectivity and an odd number of RB elements. The fourth link local identifier 2868 may comprise a value associated with E2 (e.g. #2).

Figure 29:
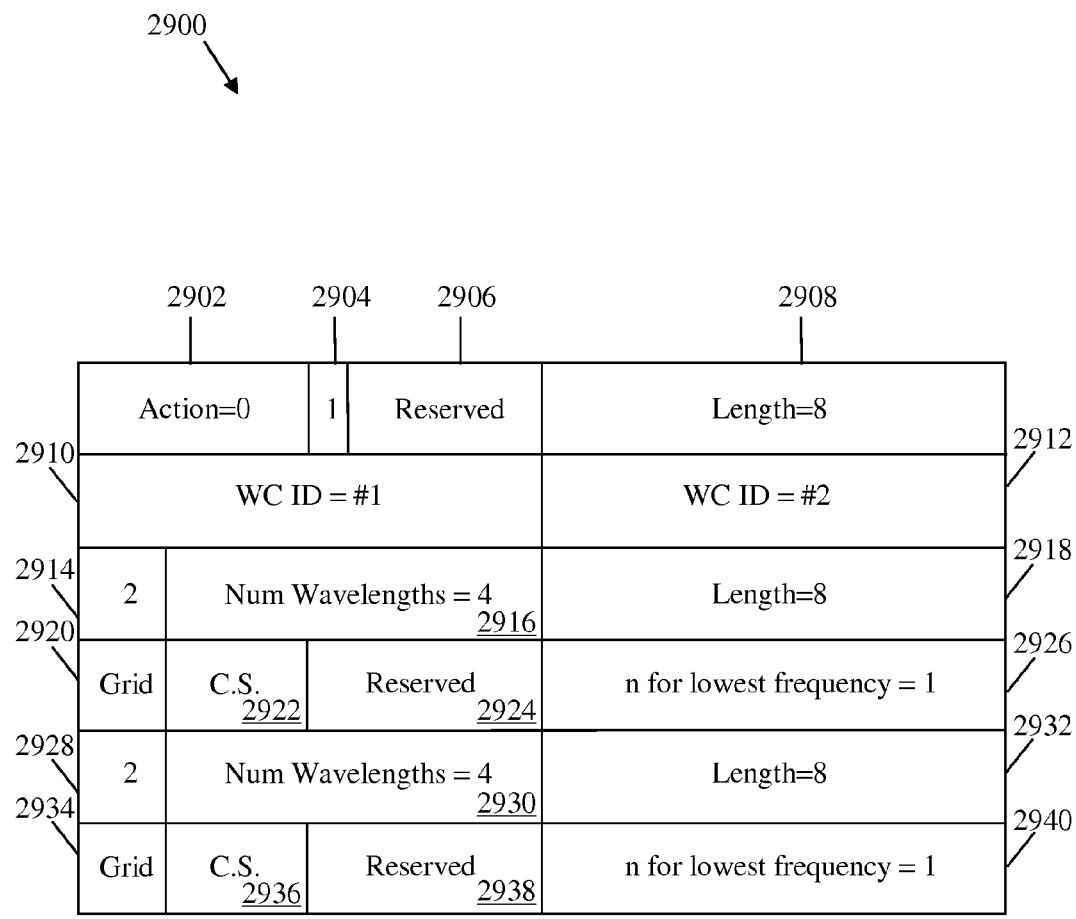
FIG. 29 is a schematic diagram of an embodiment of a wavelength conversion range TLV.

FIG. 29 illustrates an embodiment of a wavelength conversion range TLV 2900 that may be used to represent constraints and capabilities of components in the WC pool architecture 2700. Specifically, the wavelength conversion range TLV 2900 may represent the wavelength conversion range of the first WC 2710 and the second WC 2712. For example, the wavelength range for input for both the first WC 2710 and the second WC 2712 may be from L1 to L2 (L2≧L1), and the range of output may be from L3 to L4 (L4≧L3), where L1, L2, L3, and L4 are wavelength values.

The wavelength conversion range TLV 2900 may comprise an action field 2902, a bit flag 2904, a reserved field 2906, a length field 2908, a first WC ID 2910, and a second WC IDs 2912, which may be associated with the first WC 2710 and the second WC 2712 in the WC pool architecture 2700. These fields may collectively represent a RB set field, e.g. similar to the RB set TLV 2000. The action field 2902 may be set to about zero to indicate an inclusive list of RB elements, e.g. the first WC ID 2910 and the second WC ID 2912. The bit flag 2904 may correspond to the E bit 2004 and may be set to about one to indicate an even number of RB elements. The first WC ID 2910 may comprise a value (e.g. #1) associated with the first WC 2710 and the second WC ID 2912 may comprise a value (e.g. #2) associated with the second WC 2712.

Additionally, the wavelength conversion range TLV 2900 may comprise a second action field 2914, a first number of wavelengths field 2916, a second length field 2918, a first grid field 2920, a first channel spacing (CS) field 2922, a second reserved field 2924, and a first number (n) field 2926. These fields may collectively represent a first wavelength set TLV associated with the first WC ID 2910 and that includes a first lambda label. The first lambda label may comprise the first grid field 2920, the first CS field 2922, the second reserved field 2924, and the first n field 2926. The second action field 2914 may be set to about two to indicate that the first lambda field represents an inclusive wavelength range and identifies the first wavelength (e.g. L1) and the total number of wavelengths that are included in the wavelength range. The first number of wavelengths field 2916 may indicate the quantity of wavelengths indicated in the first wavelength set TLV, which may be equal to about four (e.g. for L1, L2, L3, and L4).

The first grid field 2920 may indicate the WDM grid specification used. For example, the first grid field 2920 may be set to one to indicate an ITU-T DWDM wavelength grid or may be set to two to indicate an ITU-T CWDM wavelength grid. The first CS field 2922 may indicate the spacing between the wavelength channels. For example, the first CS field 2922 may be set to one to indicate a channel spacing of about 12.5 gigahertz (GHz), may be set to two to indicate a channel spacing of about 25 GHz, or may be set to three to indicate a channel spacing of about 50 GHz. Alternatively, the first CS field 2922 may be set to four to indicate a channel spacing of about 100 GHz, or may be set to five to indicate a channel spacing of about 200 GHz. The first n field 2926 may be used to specify a specific frequency or wavelength. For example, n may be an integer used to specify a frequency using the formula:

$$\text{Frequency}=183.1 \text{ terahertz (THz)} \pm n^*(\text{channel spacing})$$

where the channel spacing is defined in the first CS field 2922. More information on the lambda label can be found in draft-otani-ccamp-gmpls-lambda-labels-02.txt, which is incorporated herein by reference.

The wavelength conversion range TLV 2900 may also comprise a third action field 2928, a second number of wavelengths field 2930, a third length field 2932, a second grid field 2934, a second CS field 2936, a third reserved field 2938, and a second n field 2940. These fields may collectively represent a second wavelength set TLV associated with the second WC ID 2912 and that includes a second lambda label. The second lambda label may comprise the second grid field 2934, the second CS field 2936, the third reserved field 2938, and the second n field 2940. The third action field 2928 may be set to about two to indicate that the second lambda field represents an inclusive wavelength range and identifies the first wavelength (e.g. L1) and the total number of wavelengths that are included in the wavelength range. The second number of wavelengths field 2930 may indicate the quantity of wavelengths indicated in the second wavelength set TLV, which may be equal to about four (e.g. for L1, L2, L3, and L4). The second grid field 2934 may indicate the WDM grid specification used, for example similar to the first grid 2920. The second CS field 2936 may indicate the spacing between the wavelength channels, for example similar to the first CS field 2922. The second n field 2940 may be used to specify a specific frequency or wavelength, for example similar to the first n field 2926.

Figure 30:
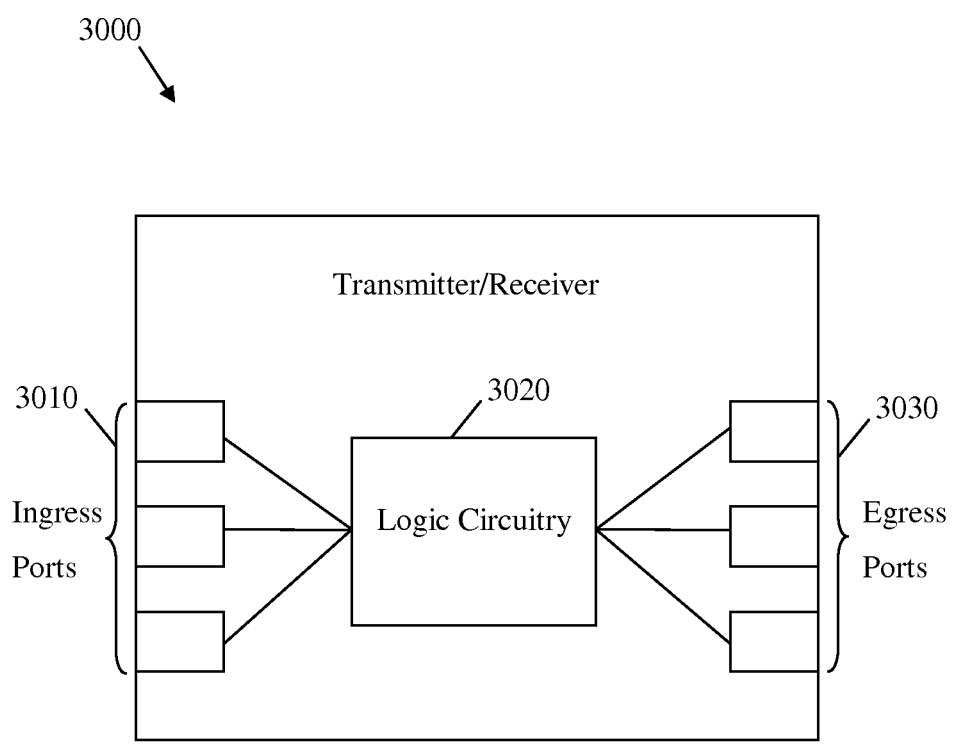
FIG. 30 is a schematic diagram of an embodiment of a transmitter/receiver unit.

FIG. 30 illustrates an embodiment of a transmitter/receiver unit 3000, which may be located at or coupled to any of the NEs or part of the control plane in the WSON. The transmitter/receiver unit 3000 may be any device that transports frames through the WSON. For instance, the transmitter/receiver unit 3000 may correspond to or may be located in a network node, such as regenerators, OEO switches, WCs, OXCs, PXCs, type I or type II ROADMs, WSSs, FOADMs, or combinations thereof. The node may include bridges, switches, routers, or various combinations of such devices. The transmitted/receiver unit 3000 may comprise a plurality of ingress ports or units 3010 for receiving frames, objects, or TLVs from other nodes, logic circuitry 3020 to determine which nodes to send the frames to, and a plurality of egress ports or units 3030 for transmitting frames to the other nodes.

Figure 31:
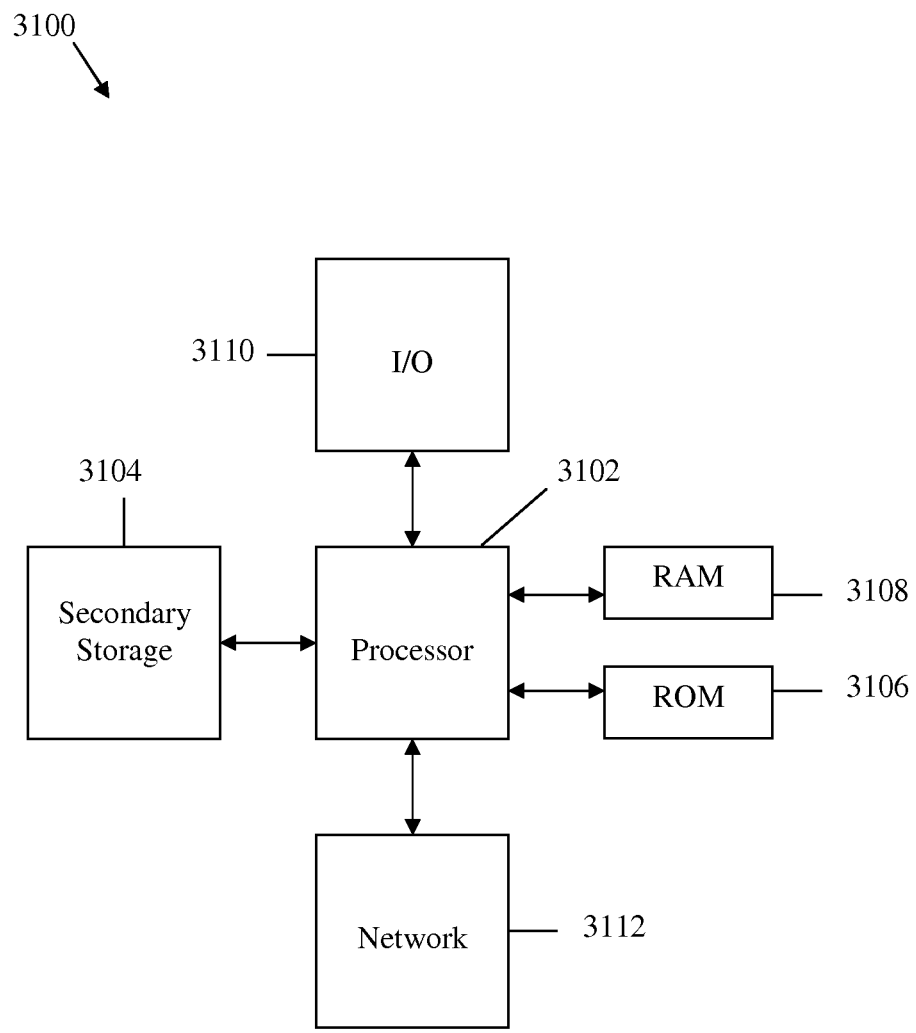
FIG. 31 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 31 illustrates a typical, general-purpose network component 3100 suitable for implementing one or more embodiments of the components disclosed herein. The network component 3100 includes a processor 3102 (which may be referred to as a central processor unit or CPU) that is in communication with memory devices including secondary storage 3104, read only memory (ROM) 3106, random access memory (RAM) 3108, input/output (I/O) devices 3110, and network connectivity devices 3112. The processor 3102 may be implemented as one or more CPU chips, or may be part of one or more application specific integrated circuits (ASICs).

The secondary storage 3104 is typically comprised of one or more disk drives or tape drives and is used for non-volatile storage of data and as an over-flow data storage device if RAM 3108 is not large enough to hold all working data. Secondary storage 3104 may be used to store programs that are loaded into RAM 3108 when such programs are selected for execution. The ROM 3106 is used to store instructions and perhaps data that are read during program execution. ROM 3106 is a non-volatile memory device that typically has a small memory capacity relative to the larger memory capacity of secondary storage. The RAM 3108 is used to store volatile data and perhaps to store instructions. Access to both ROM 3106 and RAM 3108 is typically faster than to secondary storage 3104.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g. from about 1 to about 10 includes 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k^*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a network element (NE) configured to communicate at least one of signal constraints and processing capabilities for a plurality of resource blocks (RBs) associated with a network node in a wavelength switched optical network (WSON) node Type-Length-Value (TLV) and signal constraints and processing capabilities associated with a link in a WSON link TLV,
wherein the WSON node TLV comprises a node identifier (ID), one or more Generalized Multi-Protocol Label Switching (GMPLS) TLVs, a connectivity matrix TLV, and a resource pool TLV, and
wherein the WSON link TLV comprises a link ID, one or more GMPLS TLVs, and a port wavelength restriction TLV.

2. The apparatus of claim 1, wherein the WSON node TLV further comprises a RB pool state TLV, and wherein the WSON link TLV further comprises an available wavelength TLV and a shared backup wavelength TLV.

3. The apparatus of claim 1, wherein the NE is further configured to communicate a WSON dynamic node TLV that comprises a node ID and a RB pool state TLV if separation of dynamic information from static information is allowed.

4. The apparatus of claim 1, wherein the NE is further configured to communicate a WSON dynamic link TLV that comprises a node ID, an available wavelength TLV, and a shared backup wavelength TLV if separation of dynamic information from static information is allowed.

5. The apparatus of claim 1, wherein the resource pool TLV comprises a RB descriptor TLV, a RB accessibility TLV, a resource range restrictions TLV, and a RB pool state TLV.

6. The apparatus of claim 1, wherein the signal constraints and processing capabilities for the RBs are encoded in a RB set Type-Length-Value (TLV) that comprises an action field, an event (E) bit, a connectivity (C) bit, a length field, and one or more RB identifiers (IDs).

7. The apparatus of claim 6, wherein the action field has a value of about zero that indicates an inclusive list of RBs in the RB set TLV or a value of about two that indicates an inclusive range of RBs in the RB set TLV.

8. The apparatus of claim 6, wherein the E bit is equal to about one and indicates an even number of RBs in the RB set TLV or is equal to about zero and indicates an odd number of RBs in the RB set TLV, and wherein the C bit is equal to about zero and indicates a fixed connectivity or is equal to about one and indicates a switched connectivity.

9. The apparatus of claim 6, wherein each one of the RB IDs has a unique value associated with one RB element, and wherein the RB element corresponds to a wavelength converter (WC), a regenerator, or an optical-electrical-optical (OEO) switch.

10. A network component comprising:
a transmitter unit configured to transmit a resource block (RB) descriptor Type-Length-Value (TLV), a RB accessibility TLV, a resource range restriction TLV, and a resource usage state TLV that each comprise a RB set field via Generalized Multi-Protocol Label Switching (GMPLS) routing,
wherein the RB descriptor TLV indicates relatively static information about a plurality of RBs that corresponds to a resource pool and comprises the RB set field and a number of RBs field that indicates the number of included RBs, a modulation type list TLV, a Forward Error Correction (FEC) type list TLV, a client signal type TLV, a bit rate range list TLV, and a processing capability list TLV.

11. A network component comprising:
a transmitter unit configured to transmit a resource block (RB) descriptor Type-Length-Value (TLV), a RB accessibility TLV, a resource range restriction TLV, and a resource usage state TLV that each comprise a RB set field via Generalized Multi-Protocol Label Switching (GMPLS) routing,
wherein the RB accessibility TLV describes a structure of the resource pool in relation to a network element (NE) and comprises the RB set field and an ingress link set field that indicates a connectivity of a plurality of ports and an ingress or egress link direction for each of the ports.

12. A network component comprising:
a transmitter unit configured to transmit a resource block (RB) descriptor Type-Length-Value (TLV), a RB accessibility TLV, a resource range restriction TLV, and a resource usage state TLV that each comprise a RB set field via Generalized Multi-Protocol Label Switching (GMPLS) routing,
wherein the resource range restriction TLV indicates input and/or output wavelength ranges for the RBs and comprises the RB set field, an input wavelength set field that indicates wavelength input restrictions of the RBs, and an output set field that indicates wavelength output restrictions of the RBs.

13. A network component comprising:

a transmitter unit configured to transmit a resource block (RB) descriptor Type-Length-Value (TLV), a RB accessibility TLV, a resource range restriction TLV, and a resource usage state TLV that each comprise a RB set field via Generalized Multi-Protocol Label Switching (GMPLS) routing, wherein the resource usage state TLV that indicates whether each one of the RBs is available or in use and comprises the RB set field, an action field that is set to about zero to indicate a list of about 16 bit integer values or to about one to indicate a bit map, and a RB usage state field that has a one-to-one correspondence with the RB elements in the RB set field.

14. A method comprising:

receiving, by a path computation element (PCE), a resource block (RB) descriptor Type-Length-Value (TLV) that comprises a RB set field that indicates signal constraints and processing capabilities associated with a plurality of RBs that correspond to a resource pool or a network element (NE), a number of RBs field that indicates the number of included RBs, a modulation type list TLV, a Forward Error Correction (FEC) type list TLV, a client signal type TLV, a bit rate range list TLV, and a processing capability list TLV; and performing a path calculation based on the information in the RB descriptor TLV, the RB accessibility TLV, the resource range restriction TLV, and the resource usage state TLV.

15. The method of claim 14, wherein the modulation type list TLV comprises a standardized modulation (S) bit, an input modulation format (I) bit, a modulation identifier (ID), a length field, and an additional field that includes modulation parameters based on the modulation ID.

16. The method of claim 14, wherein the FEC type list TLV comprises a standardized modulation (S) bit, an input modulation format (I) bit, a FEC identifier (ID), a length field, and an additional field that includes FEC parameters based on the FEC ID.

17. The method of claim 14, wherein the bit rate range list TLV comprises one or more bit rate range fields, and wherein the bit rate range field comprises a starting bit rate and an ending bit rate for the bit rate range.

18. The method of claim 14, wherein the client signal type TLV comprises a number of General Protocol Identifiers (GPIDs) field and a GPID list that comprises one or more GPID TLVs.

19. The method of claim 14, wherein the processing capability list TLV comprises a processing capability identifier (ID), a length field, and an additional field that includes processing capability parameters based on the processing capability ID.

* * * * *

UNITED STATES PATENT AND TRADEMARK OFFICE
CERTIFICATE OF CORRECTION

PATENT NO. : 8,532,484 B2
APPLICATION NO. : 12/965217
DATED : September 10, 2013
INVENTOR(S) : Young Lee and Greg Bernstein It is certified that error appears in the above-identified patent and that said Letters Patent is hereby corrected as shown below:

Title Page 2, Item (56), Left Column, Line 33-35 should read as follows:

ITU-T Recommendation G.698.2, "Amplified Multichannel Dense Wavelength Division Multiplexing Applications with Single Channel Optical Interfaces," November 2009, 38 pages.

Signed and Sealed this
Eighth Day of October, 2013

Teresa Stanek Rea
*Deputy Director of the United States Patent and Trademark Office*